(12) United States Patent
Sano

(10) Patent No.: US 9,970,508 B2
(45) Date of Patent: May 15, 2018

(54) V-SHAPED ENGINE

(71) Applicant: YAMAHA HATSUDOKI KABUSHIKI KAISHA, Iwata-shi, Shizuoka (JP)

(72) Inventor: Taketoshi Sano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days. days.

(21) Appl. No.: 15/267,512

(22) Filed: Sep. 16, 2016

(65) Prior Publication Data

US 2017/0082171 A1 Mar. 23, 2017

(30) Foreign Application Priority Data

Sep. 17, 2015 (JP) .................................. 2015-184303

(51) Int. Cl.
*F16F 15/26* (2006.01)
*F02B 61/02* (2006.01)
(Continued)

(52) U.S. Cl.
CPC .............. *F16F 15/264* (2013.01); *F01B 1/04* (2013.01); *F02B 61/02* (2013.01); *F02B 75/06* (2013.01); *F02B 75/22* (2013.01)

(58) Field of Classification Search
CPC .... F02B 75/22; F02B 2075/025; F02B 25/28; F02B 75/221; F02B 75/246
See application file for complete search history.

(56) References Cited

U.S. PATENT DOCUMENTS

| 3,978,828 A | * | 9/1976 | Weber ..................... F02B 75/22 |
| | | | 123/54.7 |
| 4,644,916 A | * | 2/1987 | Kitagawa ................ F02B 75/22 |
| | | | 123/192.2 |

(Continued)

FOREIGN PATENT DOCUMENTS

| JP | 63-125840 A | 5/1988 |
| JP | 2005-155715 A | 6/2005 |
| JP | 4430462 B2 | 3/2010 |

OTHER PUBLICATIONS

Unknown, Desaxe, Jun. 20, 2015, Wikipedia, https://en.wikipedia.org/w/index.php?title=Desaxe&oldid=667811658.†

(Continued)

*Primary Examiner* — Long T Tran
(74) *Attorney, Agent, or Firm* — Keating and Bennett, LLP

(57) ABSTRACT

Vibration generated by a secondary inertia couple caused by lateral pressures from pistons of a V-shaped engine is reduced. A cylinder axis of a first cylinder and a cylinder axis of a second cylinder define a splay angle in a range of about 45° to about 75°. First and second crankpins have a phase difference in a circumferential direction of a shaft center of a crankshaft in a range of about 30° to about 90°. A balancer shaft included in a single-shaft balancer mechanism rotates in a direction opposite to that in which the crankshaft rotates at a speed twice that at which the crankshaft rotates. As viewed in an axial direction of the crankshaft, the balancer shaft is located on a side of a second reference line which is opposite to a side including first and second pistons, the second reference line being perpendicular or substantially perpendicular to a first reference line and passing through the shaft center of the crankshaft, the first reference line passing through the shaft center of the crankshaft and dividing the splay angle into two equal sub-angles.

7 Claims, 29 Drawing Sheets

(51) Int. Cl.
*F02B 75/22* (2006.01)
*F02B 75/06* (2006.01)
*F01B 1/04* (2006.01)

(56) References Cited

U.S. PATENT DOCUMENTS

| | | | | |
|---|---|---|---|---|
| 4,683,849 | A † | 8/1987 | Brown | |
| 6,058,901 | A † | 5/2000 | Lee | |
| 6,397,809 | B1 * | 6/2002 | Sayama | F02B 75/22 123/192.2 |
| 6,895,919 | B1 * | 5/2005 | Taxon | F02B 75/06 123/192.2 |
| 6,945,201 | B2 * | 9/2005 | Taxon | F01M 13/00 123/41.86 |
| 8,616,172 | B2 * | 12/2013 | Morgan | F02B 75/06 123/192.1 |
| 2002/0038644 | A1 * | 4/2002 | Korenjak | F02B 67/04 123/192.2 |
| 2005/0109305 | A1 | 5/2005 | Takeuchi | |
| 2005/0155562 | A1 * | 7/2005 | Taxon | F01M 13/00 123/41.86 |
| 2011/0073060 | A1 * | 3/2011 | Morgan | F02B 75/06 123/192.2 |
| 2012/0255514 | A1 * | 10/2012 | Morgan | F02B 75/06 123/192.2 |

OTHER PUBLICATIONS

Wes Siler, Conceptual diagram of offset cylinder, pp. 1-3, Dec. 29, 2010, RideApart.com, https://rideapart.com/articles/free-power-off-set-cylinders-explained.†

Thomas Barber, The new Horex motorcycle with VR6 engine: A Technical Analysis, pp. 1-5, Mar. 20, 2012, MotorcycleDaily.com, http://www.motorcycledaily.com/2012/03/the-new-horex-motorcycle-with-vr6-engine-a-technical-analysis/.†

* cited by examiner
† cited by third party

V-SHAPED ENGINE

CROSS REFERENCE TO RELATED APPLICATIONS

This application claims the benefit of priority to Japanese Patent Application 2015-184303 filed on Sep. 17, 2015, the entire contents of which application are hereby incorporated by reference herein.

BACKGROUND OF THE INVENTION

1. Field of the Invention

The present invention relates to a V-shaped engine, and more particularly a V-shaped engine including a mechanism that reduces vibration caused by a secondary component of an inertia couple caused by lateral pressures from pistons.

2. Description of the Related Art

Engines include reciprocating engines, for example. A reciprocating engine includes a motion conversion mechanism for converting reciprocating movements of the piston into rotational movements of the crankshaft (hereinafter referred to as piston-crank mechanism).

As the piston-crank mechanism operates, vibration occurs. In view of this, in a reciprocating engine, a mechanism is provided for reducing vibration generated as the piston-crank mechanism operates (hereinafter referred to as balancer mechanism).

Some reciprocating engines include a plurality of cylinders (such an engine will be hereinafter referred to as multi-cylinder engine). Some multi-cylinder engines have two cylinders positioned next to each other around the axis of the crankshaft as viewed in the axial direction of the crankshaft, where one of the cylinders is angled relative to the other one (such an engine will be hereinafter referred to as V-shaped engine).

In a two-cylinder V-shaped engine, the angle of one cylinder relative to the other (hereinafter referred to as a bank angle) may be 90° such that vibration caused by a primary component of an inertia force generated as the piston-crank mechanism operates (hereinafter referred to as primary inertia force) can be cancelled out. Further, if the crankpin rotatably supporting the connecting rod connected to the piston in one cylinder and the crankpin rotatably supporting the connecting rod connected to the piston in the other cylinder are arranged around the shaft center of the crankshaft with a predetermined phase difference, i.e., the engine has a phase crank, it is possible to cancel out the primary component of the inertia force generated as the piston-crank mechanism operates even if the bank angle is not 90°.

In a two-cylinder V-shaped engine, a balancer mechanism is provided to reduce vibration caused by a secondary component of an inertia force generated as the piston-crank mechanism operates (hereinafter referred to as a secondary inertia force). The balancer mechanism is disclosed, for example, in Japanese Patent No. 4430462.

A secondary inertia force generated as the piston-crank mechanism operates includes, in addition to a secondary component of an inertia force produced by the reciprocating motion mass of the piston-crank mechanism (hereinafter referred to as secondary inertia force), a secondary component of an inertia couple caused by lateral pressures from the pistons (hereinafter referred to as secondary inertia couple). The secondary inertia couple caused by the lateral pressures from the pistons may cause vibration. Accordingly, it is preferable to reduce vibration generated by the secondary inertia couple caused by the lateral pressures from the pistons, as well. The invention disclosed in Japanese Patent No. 4430462 does not consider how to reduce vibration generated by the secondary inertia couple caused by the lateral pressures from the pistons.

SUMMARY OF THE INVENTION

Preferred embodiments of the present invention reduce vibration generated by a secondary inertia couple caused by lateral pressures from pistons of a V-shaped engine.

A V-shaped engine according to a preferred embodiment of the present invention includes a motion conversion mechanism and a balancer mechanism. The balancer mechanism reduces vibration generated as the motion conversion mechanism operates. The motion conversion mechanism includes a crankshaft, a first piston, a first connecting rod, a first crankpin, a second piston, a second connecting rod, and a second crankpin. The first piston is capable of reciprocating within a first cylinder. The first connecting rod connects the crankshaft with the first piston. The first crankpin is located on the crankshaft for swingably supporting the first connecting rod. The second piston is located within a second cylinder. The second cylinder includes a cylinder axis extending in a direction crossing a cylinder axis of the first cylinder as viewed in an axial direction of the crankshaft. The second connecting rod connects the crankshaft with the second piston. The second crankpin is located on the crankshaft. The second crankpin is located at a position different from that of the first crankpin as measured in a circumferential direction of the crankshaft. The second crankpin swingably supports the second connecting rod. The cylinder axis of the first cylinder and the cylinder axis of the second cylinder define a splay angle in a range of about 45° to about 75°, for example. The first and second crankpins have a phase difference as measured in a circumferential direction of a shaft center of the crankshaft in a range of about 30° to about 90°, for example. The balancer mechanism includes a balancer shaft. The balancer shaft is positioned parallel or substantially parallel to the crankshaft. The balancer shaft rotates in a direction opposite to that in which the crankshaft rotates. The balancer shaft rotates at a speed twice that at which the crankshaft rotates. A first reference line and a second reference line are established. The first reference line passes through the shaft center of the crankshaft as viewed in the axial direction of the crankshaft and divides the splay angle into two equal sub-angles. The second reference line is perpendicular or substantially perpendicular to the first reference line and passes through the shaft center of the crankshaft as viewed in the axial direction of the crankshaft. The balancer shaft is located on that side of the second reference line which is opposite to a side with the first and second pistons as viewed in the axial direction of the crankshaft.

In the above-described V-shaped engine, a secondary inertia force generated as the motion conversion mechanism operates and an inertia force generated as the balancer shaft rotates are used to reduce vibration generated by a secondary inertia couple caused by a lateral pressure from the first piston and a lateral pressure from the second piston.

The above-described V-shaped engine may be any V-shaped engine that balances the primary inertia force using a phase crank. For example, it may be a two-cylinder V-shaped engine or a four-cylinder V-shaped engine. The above-described V-shaped engine may be a two-cycle engine or a four-cycle engine. The above-described V-shaped engine may include a crankshaft with a shaft center offset from the cylinder axis of the first cylinder and the cylinder axis of the second cylinder.

In the above-described V-shaped engine, the balancer shaft may be located between the cylinder axis of the first cylinder and the cylinder axis of the second cylinder as viewed in the axial direction of the crankshaft, or may overlie the first reference line. The shaft center of the balancer shaft may overlie the first reference line.

The balancer shaft may be divided into two sub-shafts arranged in the axial direction. This allows the balancer shaft to be efficiently arranged in a limited space within the engine. In an arrangement with a balancer shaft divided into two sub-shafts arranged in the axial direction, for example, the two sub-shafts may be separated from each other as measured in the axial direction of the crankshaft. In this case, the two sub-shafts may not be coaxial. For example, only one sub-shaft may be coaxial with the crankshaft.

In the above-described V-shaped engine, it is preferable that the crankshaft includes a driving gear, and the balancer shaft includes a driven gear that is able to engage with the driving gear. This allows the balancer shaft to be positioned near the crankshaft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Straddled vehicles according to preferred embodiments of the present invention will now be described with reference to the drawings. In preferred embodiments of the present invention, a motorcycle will be described as a non-limiting example of the straddled vehicle. The same or corresponding elements throughout the drawings will be labeled with the same characters, and their description will not be repeated.

Figure 1:
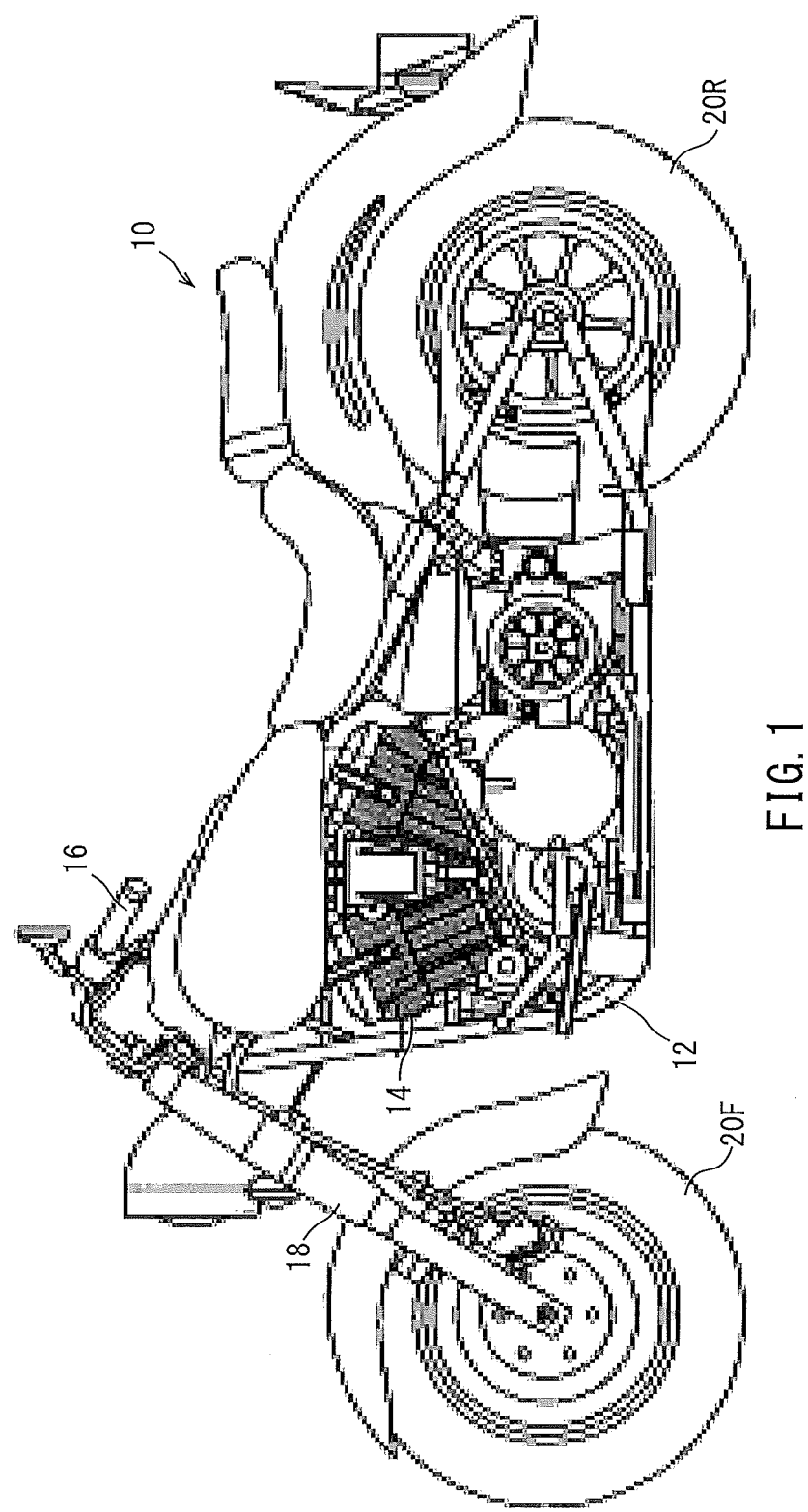
FIG. 1 is a left side view of a motorcycle according to a first preferred embodiment of the present invention.

FIG. 1 is a left side view of a motorcycle 10 according to a first preferred embodiment of the present invention. The motorcycle 10 includes a vehicle body frame 12 and an engine 14.

The vehicle body frame 12 includes a head pipe into which a steering shaft is inserted. Handlebars 16 are positioned on the upper end of the steering shaft. A front fork 18 is positioned on the lower end of the steering shaft. The front fork 18 rotatably supports a front wheel 20F.

The engine 14 is supported by the vehicle body frame 12. As power from the engine 14 is transmitted to a rear wheel 20R, the rear wheel 20R rotates.

Figure 2:
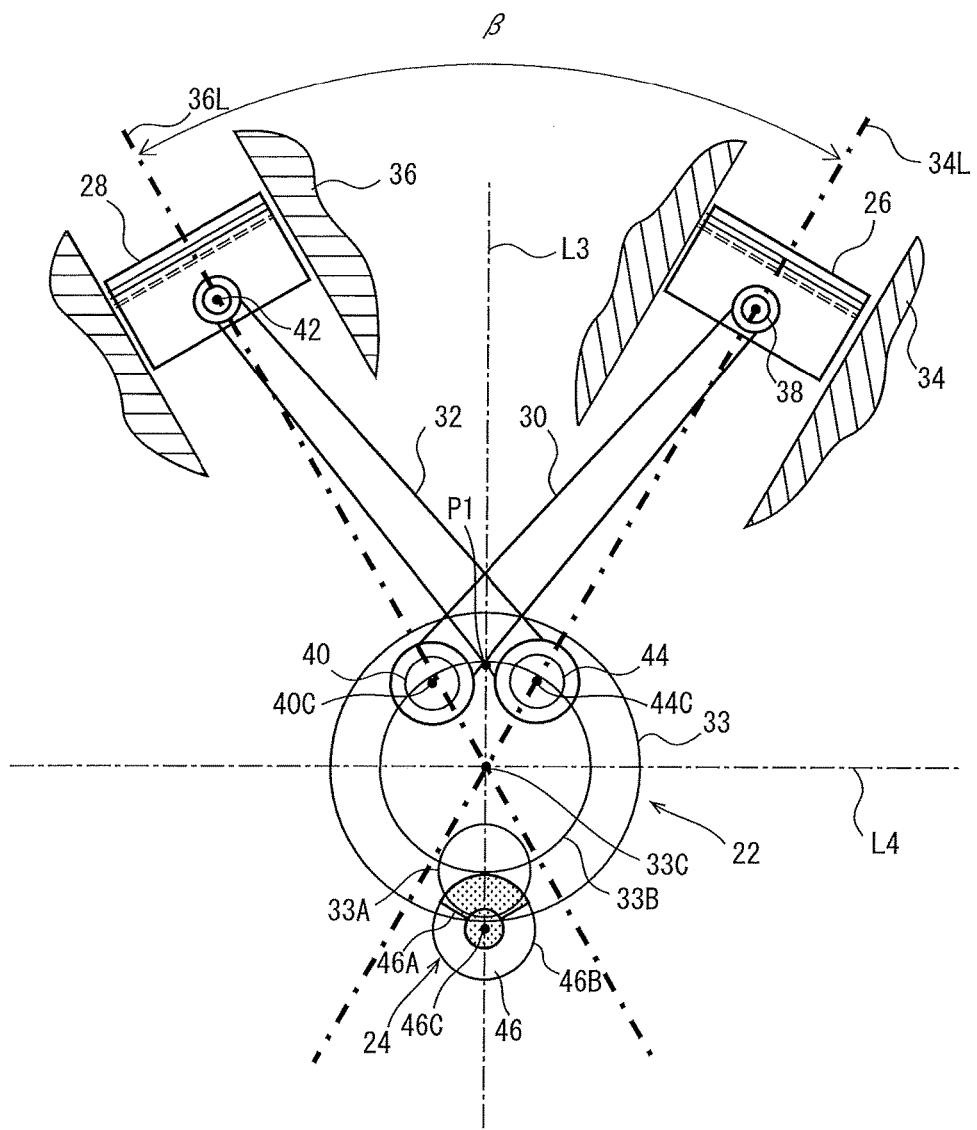
FIG. 2 is a schematic view of the internal structure of the engine.

The engine 14 will be described with reference to FIG. 2. FIG. 2 is a schematic view of the internal structure of the engine 14.

The engine 14 preferably is a four-cycle, two cylinder V-shaped engine, for example. The engine 14 includes a piston-crank mechanism 22 and a balancer mechanism 24.

The piston-crank mechanism 22 includes a piston 26, a piston 28, a connecting rod 30, a connecting rod 32, and a crankshaft 33. These components will be described below.

The piston 26 is located within the cylinder 34. The piston 26 is capable of reciprocating along the central axis of the cylinder 34 (hereinafter referred to as cylinder axis 34L).

The piston 28 is located within the cylinder 36. The piston 28 is capable of reciprocating along the central axis of the cylinder 36 (hereinafter referred to as cylinder axis 36L).

The connecting rod 30 connects the piston 26 with the crankshaft 33. More specifically, one end of the connecting rod 30 is connected with the piston 26 by a piston pin 38 provided in between. The other end of the connecting rod 30 is connected with the crankshaft 33 by a crankpin 40 provided in between.

The connecting rod 32 connects the piston 28 with the crankshaft 33. More specifically, one end of the connecting rod 32 is connected with the piston 28 by a piston pin 42 provided in between. The other end of the connecting rod 32 is connected with the crankshaft 33 by a crankpin 44 provided in between.

It is assumed that point P1, which is located in the middle (i.e., middle as measured in the circumferential direction of the shaft center 33C of the crankshaft 33) between the shaft center 40C of the crankpin 40 and the shaft center 44C of the crankpin 44, is located on straight line L3, which is an example of the first reference line. Straight line L3 passes through the shaft center 33C of the crankshaft 33 and divides the splay angle $\beta$ defined by the two cylinder axes 34L and 36L into two equal sub-angles. In the engine 14, when point P1 is located on straight line L3, the connecting rod 30 crosses the connecting rod 32 as viewed in the axial direction of the crankshaft 33.

Figure 3:
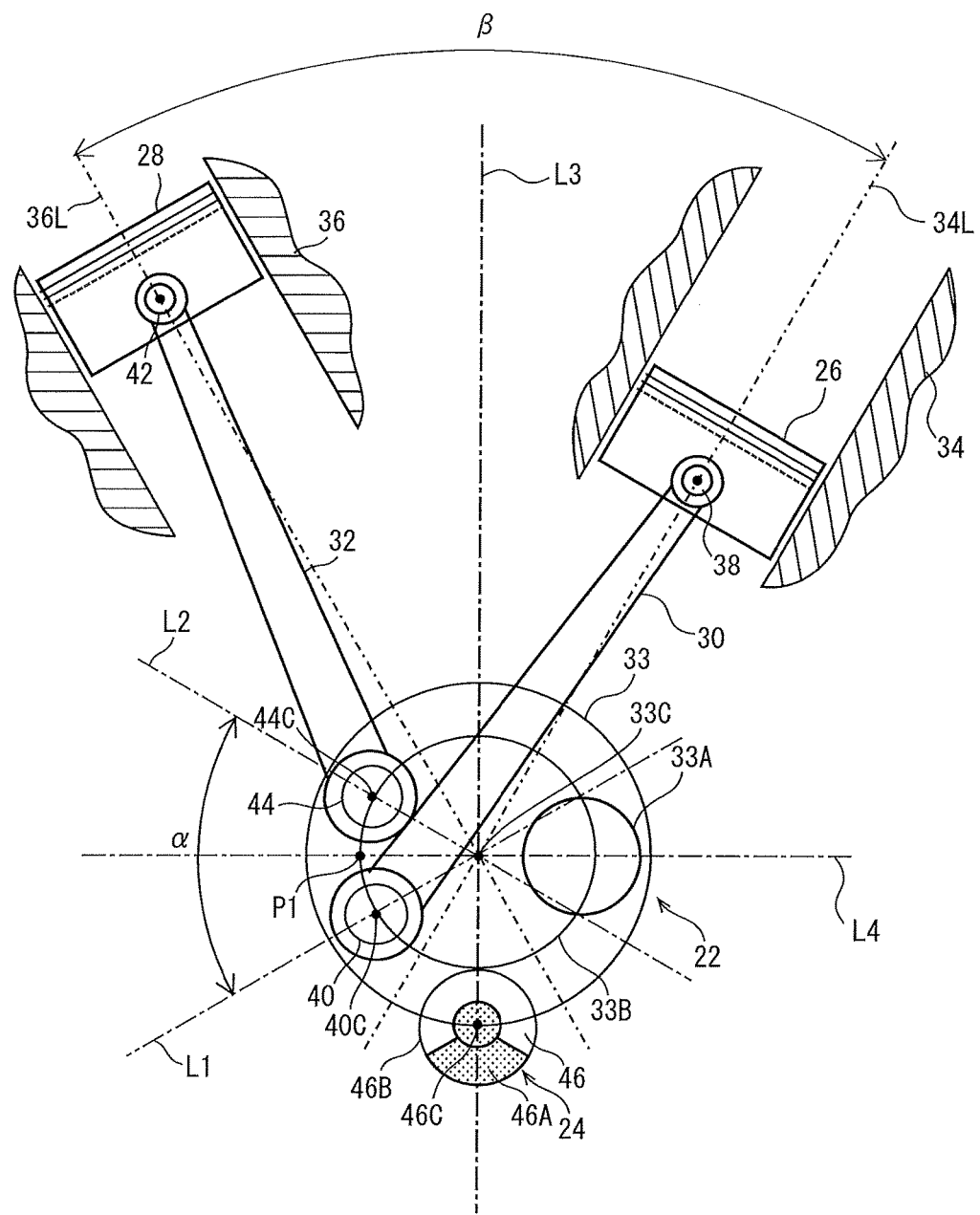
FIG. 3 is a schematic view of the internal structure of the engine.

The angles $\alpha$ and $\beta$ will be described with reference to FIG. 3. In the engine 14, the splay angle $\beta$ defined by the two cylinder axes 34L and 36L is preferably about 60°, for example. In the engine 14, the crankpins 40 and 44 are located at different positions as measured in the circumferential direction of the shaft center 33C of the crankshaft 33. That is, the engine 14 has a phase crank. In the engine 14, the phase difference between the crankpins 40 and 44 as measured in the circumferential direction of the shaft center 33C of the crankshaft 33, i.e. the angle $\alpha$ formed by straight line L1 connecting the shaft center 33C of the crankshaft 33 with the shaft center 40C of the crankpin 40 and straight line L2 connecting the shaft center 33C of the crankshaft 33 with the shaft center 44C of the crankpin 44 preferably is about 60°, for example.

Returning to FIG. 2, the crankshaft 33 is rotatable about the shaft center 33C. The crankshaft 33 includes a crank balancer 33A. The crank balancer 33A generates an inertia force as the crankshaft 33 rotates.

In the piston-crank mechanism 22, reciprocating movements of the pistons 26 and 28 are converted into rotational movements of the crankshaft 33. That is, the piston crank mechanism 22 works as a motion conversion mechanism.

The balancer mechanism 24 is a single-shaft balancer mechanism. The balancer mechanism 24 includes a balancer shaft 46.

The balancer shaft 46 includes a shaft center 46C. The balancer shaft 46 is positioned parallel or substantially parallel to the crankshaft 33.

Straight line L4, which is an example of the second reference line, is established as shown in FIG. 2. Straight line L4 is perpendicular or substantially perpendicular to straight line L3 and passes through the shaft center 33C of the crankshaft 33 as viewed in the axial direction of the crankshaft 33.

The balancer shaft 46 is located on that side of straight line L4 which is opposite to the side with the pistons 26 and 28. The shaft center 46C of the balancer shaft 46 is located on straight line L3 as viewed in the axial direction of the crankshaft 33.

The balancer shaft 46 is rotatable about the shaft center 46. The balancer shaft 46 rotates in the direction opposite to that of the crankshaft 33. The balancer shaft 46 rotates at a speed twice that of the crankshaft 33.

The balancer shaft 46 includes a gear 46B. The gear 46B engages with a gear 33B included in the crankshaft 33. Thus, the balancer shaft 46 rotates as the crankshaft 33 rotates.

The balancer shaft 46 includes a balancer 46A. The balancer 46A generates an inertia force as the balancer shaft 46 rotates.

In the engine 14, a secondary inertia force generated as the piston-crank mechanism 22 operates and the inertia force generated as the balancer shaft 46 rotates are used to reduce vibration generated by a secondary inertia couple caused by the lateral pressures from the pistons. The reasons for this will be provided below.

First, the conditions for reducing the primary inertia force F1 in a V-shaped engine having a phase crank will be described with reference to FIG. 4. The component of the primary inertia force F1 in the top-to-bottom direction (i.e. y-direction) in FIG. 4, F1$y$, is expressed by the following equation of Formula 1.

1. Conditions for Reducing Primary Inertia Force

Formula 1

$$F1_y = mr\omega^2 \cdot \left(\cos\left(-\frac{\beta}{2}\right) \cdot \cos\left(\theta + \frac{\alpha+\beta}{2}\right) + \cos\frac{\beta}{2} \cdot \cos\left(\theta - \frac{\alpha+\beta}{2}\right)\right) + k \cdot mr\omega^2 \cdot \cos(\theta+\gamma) \quad (1)$$

Here, m is the reciprocating motion mass in the piston-crank mechanism 32. r is the crank radius. ω is the angular velocity of the rotating crankshaft 33. k is the crank balance rate, i.e., coefficient indicating the magnitude of the unbalancing portion. α is the phase difference between the two crankpins 40 and 44. β is the splay angle defined by the two cylinder axes 34L and 36L. γ is the position of the crank balancer 33A relative to point P1. θ is the angle of rotation of the crankshaft 33. θ is measured relative to the value obtained when point P1 is located on the y-axis at the position closer to the piston.

Tidying up the equation of Formula 1 using the trigonometric function formula gives the following equation of Formula 2.

Formula 2

$$F1_y = mr\omega^2 \cdot \cos\theta\left(2\cos\frac{\alpha+\beta}{2} \cdot \cos\frac{\beta}{2} + k\cdot\cos\gamma\right) - mr\omega^2 \cdot \sin\theta \cdot k \cdot \sin\gamma \quad (2)$$

The following conditions of Formulas 3 and 4 must be established in order that F1$y$=0.

Formula 3

$$\sin\gamma = 0 \quad (3)$$

Formula 4

$$\cos\gamma < 0 \quad (4)$$

The above conditions give γ=180°. k is expressed by the following equation of Formula 5.

Formula 5

$$k = 2\cos\frac{\alpha+\beta}{2} \cdot \cos\frac{\beta}{2} \quad (5)$$

Figure 4:
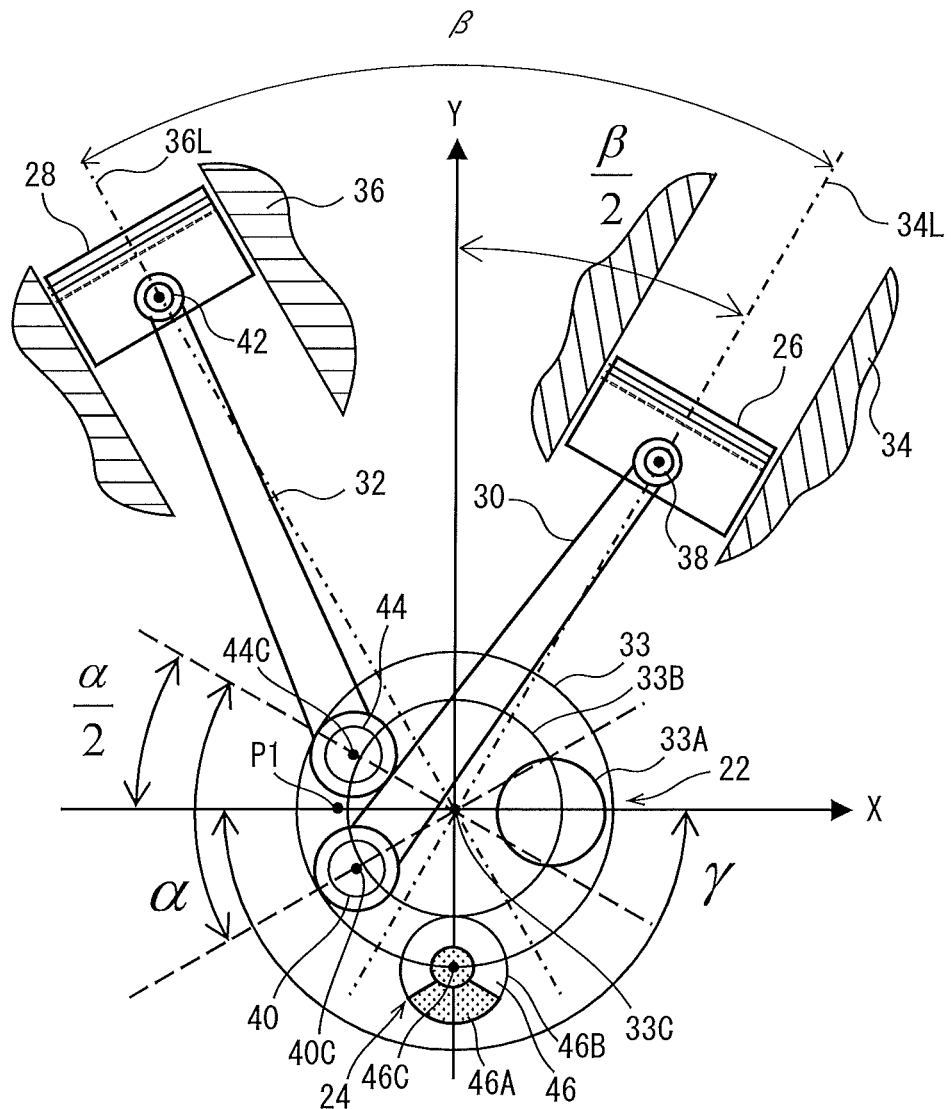
FIG. 4 is a schematic view of the internal structure of the engine.

The component of the primary inertia force F1 in the left-to-right direction (i.e. x-direction) in FIG. 4, F1$x$, is expressed by the following equation of Formula 6.

Formula 6

$$F1_x = mr\omega^2 \cdot \left(\sin\frac{\beta}{2} \cdot \cos\left(\theta + \frac{\alpha+\beta}{2}\right) + \sin\left(-\frac{\beta}{2}\right) \cdot \cos\left(\theta - \frac{\alpha+\beta}{2}\right)\right) - k \cdot mr\omega^2 \cdot \sin(\theta+\gamma) \quad (6)$$

Tidying up the above equation of Formula 6 using the trigonometric function formula gives the following equation of Formula 7.

Formula 7

$$F1_x = mr\omega^2 \cdot \sin\theta\left(-2\sin\frac{\alpha+\beta}{2} \cdot \sin\frac{\beta}{2} - k\cdot\cos\gamma\right) - mr\omega^2 \cdot \cos\theta \cdot k \cdot \sin\gamma \quad (7)$$

The following conditions of Formulas 8 and 9 must be established in order that F1$x$=0.

Formula 8

$$\sin\gamma = 0 \quad (8)$$

Formula 9

$$\cos\gamma < 0 \quad (9)$$

The above conditions give γ=180°. k is expressed by the following equation of Formula 10.

Formula 10

$$k = 2\sin\frac{\alpha+\beta}{2} \cdot \sin\frac{\beta}{2} \quad (10)$$

Thus, if the primary inertia force F1 is zero, the following equations of Formulas 11 and 12 are established.

Formula 11

$$\gamma = 180° \quad (11)$$

Formula 12

$$k = 2\cos\frac{\alpha+\beta}{2} \cdot \cos\frac{\beta}{2} = 2\sin\frac{\alpha+\beta}{2} \cdot \sin\frac{\beta}{2} \quad (12)$$

The conditions relating to crank balance rate give the following equation of Formula 13.

Formula 13

$$\cos\frac{\alpha+\beta}{2} \cdot \cos\frac{\beta}{2} - \sin\frac{\alpha+\beta}{2} \cdot \sin\frac{\beta}{2} = \cos\left(\frac{\alpha+\beta}{2} + \frac{\beta}{2}\right) = \cos\left(\frac{\alpha}{2} + \beta\right) = 0 \quad (13)$$

Thus, the condition that can be expressed in the following equation of Formula 14 is derived.

Formula 14

$$\frac{\alpha}{2} + \beta = 90° \pm 180° \times n \quad (14)$$

The conditions that can be expressed by the following equations of Formulas 15 and 16 are assumed and substituted into the above equations of Formulas 5 and 10 relating to k give the following equations of Formulas 17 and 18.

Formula 15

$$\beta < 90° \quad (15)$$

Formula 16

$$\frac{\alpha}{2} + \beta = 90° \quad (16)$$

Formula 17

$$k = 2\cos\frac{\alpha+\beta}{2} \cdot \cos\frac{\beta}{2} = 2\cos\left(90° - \frac{\beta}{2}\right) \cdot \cos\frac{\beta}{2} = 2\sin\frac{\beta}{2} \cdot \cos\frac{\beta}{2} \quad (17)$$

Formula 18

$$k = 2\sin\frac{\alpha+\beta}{2} \cdot \sin\frac{\beta}{2} = 2\sin\left(90° - \frac{\beta}{2}\right) \cdot \sin\frac{\beta}{2} = 2\sin\frac{\beta}{2} \cdot \cos\frac{\beta}{2} \quad (18)$$

Thus, the conditions for making the primary inertia force F1 in an engine having a phase crank zero are expressed by the following equations of Formulas 19 to 21.

Formula 19

$$\gamma = 180° \quad (19)$$

Formula 20

$$\frac{\alpha}{2} + \beta = 90° \pm 180° \times n \quad (20)$$

Formula 21

$$k = 2\sin\frac{\beta}{2} \cdot \cos\frac{\beta}{2} \quad (21)$$

2. Conditions for Reducing Secondary Inertia Force

Next, the conditions for reducing the secondary inertia force F2 in a V-shaped engine having a phase crank will be described with reference to FIG. 4. The component of the secondary inertia force F2 in the top-to-bottom direction (i.e. y-direction) in FIG. 4, F2y, is expressed by the following equation of Formula 22.

Formula 22

$$F2_y = \frac{mr\omega^2}{\lambda} \cdot \left(\cos\left(-\frac{\beta}{2}\right) \cdot \cos 2\left(\theta + \frac{\alpha+\beta}{2}\right) + \cos\frac{\beta}{2} \cdot \cos 2\left(\theta - \frac{\alpha+\beta}{2}\right)\right) \quad (22)$$

Here, m is the reciprocating motion mass in the piston-crank mechanism 32. r is the crank radius. ω is the angular velocity of the rotating crankshaft 33. α is the phase difference between the two crankpins 40 and 44. β is the splay angle defined by the two cylinder axes 34L and 36L. λ is the association ratio (l/r). θ is the angle of rotation of the crankshaft 33. θ is measured relative to the value obtained when point P1 is located on the y-axis at the position closer to the piston.

Tidying up the above equation of Formula 22 using the trigonometric function formula gives the following equation of Formula 23.

Formula 23

$$F2_y = \frac{mr\omega^2}{\lambda} \cdot \cos 2\theta \cdot \left(2\cos(\alpha+\beta) \cdot \cos\frac{\beta}{2}\right) \quad (23)$$

The component of the secondary inertia force F2 in the left-to-right direction (i.e., x-direction) in FIG. 4, F2x, is expressed by the following equation of Formula 24.

Formula 24

$$F2_x = \frac{mr\omega^2}{\lambda} \cdot \left(\sin\frac{\beta}{2} \cdot \cos 2\left(\theta + \frac{\alpha+\beta}{2}\right) + \sin\left(-\frac{\beta}{2}\right) \cdot \cos 2\left(\theta - \frac{\alpha+\beta}{2}\right)\right) \quad (24)$$

Tidying up the above equation of Formula 24 using the trigonometric function formula gives the following equation of Formula 25.

Formula 25

$$F2_x = \frac{mr\omega^2}{\lambda} \cdot \sin 2\theta \cdot \left(-2\sin(\alpha+\beta) \cdot \sin\frac{\beta}{2}\right) \quad (25)$$

If the primary inertia force F1 in an engine having a phase crank is zero, the condition illustrated by the above equation of Formula 16 is established. Rearranging this equation gives the following equation of Formula 26.

Formula 26

$$\alpha+\beta=180°-\beta \quad (26)$$

Substituting this equation of Formula 26 into the above equations of Formulas 23 and 25 gives the following equations of Formulas 27 and 28.

Formula 27

$$F2_y = \frac{mr\omega^2}{\lambda} \cdot \cos 2\theta \cdot \left(-2\cos\beta \cdot \cos\frac{\beta}{2}\right) \quad (27)$$

Formula 28

$$F2_x = \frac{mr\omega^2}{\lambda} \cdot \sin 2\theta \cdot \left(-2\sin\beta \cdot \sin\frac{\beta}{2}\right) \quad (28)$$

In order that the secondary inertia force is counteracted by the inertia force generated as the balancer shaft 46 rotates, the locus of the end point of the vector of the secondary inertia force must be perfectly circular. This requires the amplitude in the top-to-bottom direction in FIG. 4 to match the amplitude in the left-to-right direction. That is, the following equation of Formula 29 must be satisfied.

Formula 29

$$\left|-2\cos\beta \cdot \cos\frac{\beta}{2}\right| = \left|-2\sin\beta \cdot \sin\frac{\beta}{2}\right| \quad (29)$$

Tidying up the above equation of Formula 29 gives the following equation of Formula 30.

Formula 30

$$2\cos\beta \cdot \cos\frac{\beta}{2} - 2\sin\beta \cdot \sin\frac{\beta}{2} = 0 \quad (30)$$

Tidying up the above equation of Formula 30 using the trigonometric function formula gives the following equation of Formula 31.

Formula 31

$$\cos\left(\beta + \frac{\beta}{2}\right) = 0 \quad (31)$$

Calculating the above equation of Formula 31 gives $\beta=60°$.

Tidying up the above equation of Formula 29 gives the following equation of Formula 32.

Formula 32

$$2\cos\beta \cdot \cos\frac{\beta}{2} + 2\sin\beta \cdot \sin\frac{\beta}{2} = 0 \quad (32)$$

Tidying up the above equation of Formula 32 using the trigonometric function formula gives the following equation of Formula 33.

Formula 33

$$\cos\left(\beta - \frac{\beta}{2}\right) = 0 \quad (33)$$

Calculating the above equation of Formula 33 gives $\beta=180°$. An arrangement with $\beta=180°$ means a horizontally-opposed engine. Thus, the locus of the end point of the vector of the secondary inertia force in a V-shaped engine having a phase crank is perfectly circular when $\beta=60°$. Further, if $\beta=60°$, the above equation of Formula 16 gives $\alpha=60°$.

Substituting $\alpha=\beta=60°$ into the above equations of Formulas 23 and 25 and calculating gives the following equations of Formulas 34 and 35.

Formula 34

$$F2_y = \left(-\frac{\sqrt{3}}{2}\right) \cdot \frac{mr\omega^2}{\lambda} \cdot \cos 2\theta \quad (34)$$

Formula 35

$$F2_x = \frac{mr\omega^2}{\lambda} \cdot \sin 2\theta \cdot \left(-\frac{\sqrt{3}}{2}\right) \quad (35)$$

Based on the above equations of Formulas 34 and 35, the magnitude of the balancer 46A in the engine 14 is expressed by the following equation of Formula 36.

Formula 36

$$\frac{\sqrt{3}\, mr}{8\lambda} \quad (36)$$

3. Phase of Balancer

Figure 5:
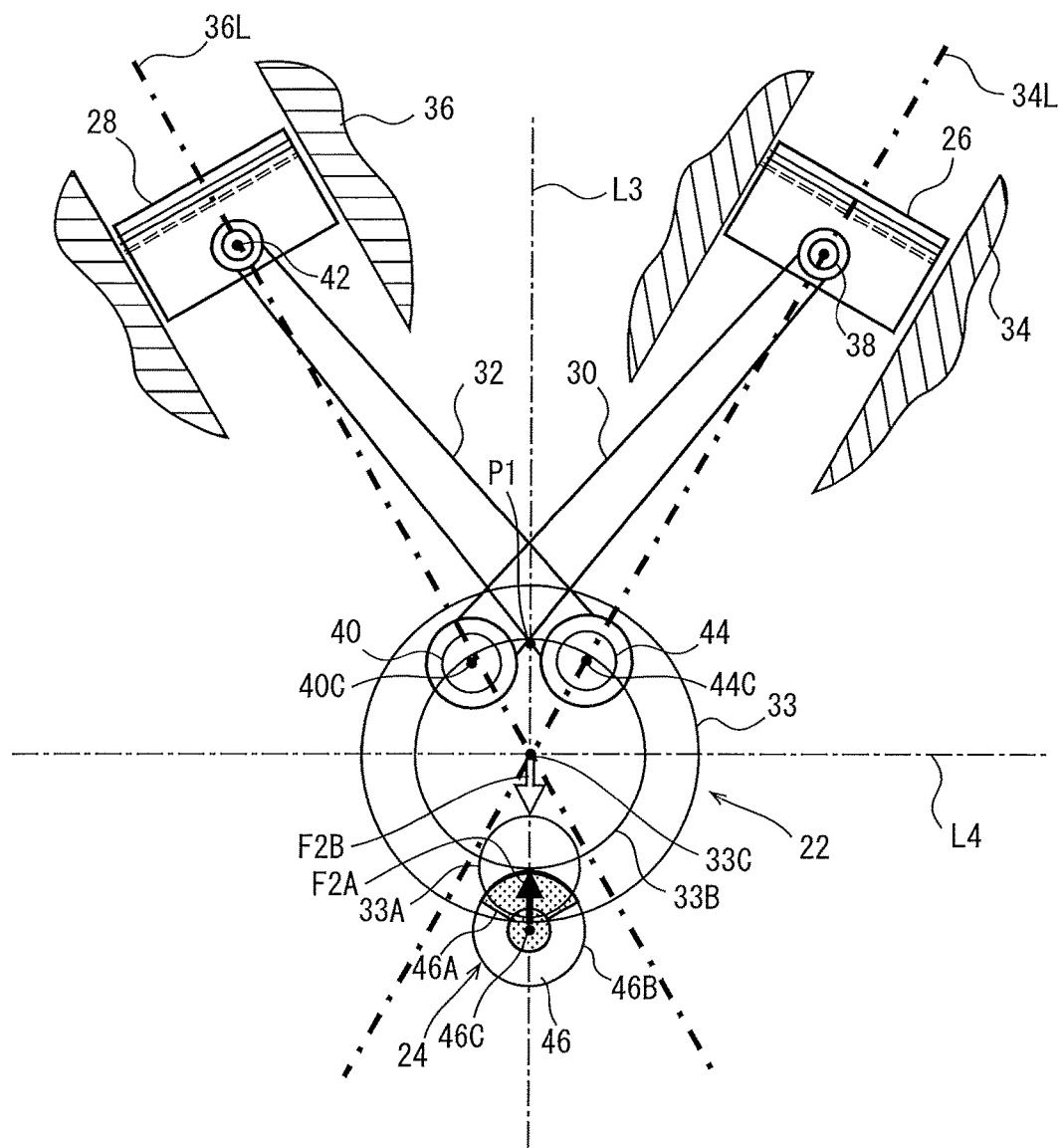
FIG. 5 is a schematic view illustrating the phase of the balancer.

Next, the phase of the balancer 46A will be described with reference to FIG. 5. As shown in FIG. 5, it is assumed that point P1, which is located in the middle (i.e., middle as measured in the circumferential direction of the shaft center 33C of the crankshaft 33) between the shaft center 40C of the crankpin 40 and the shaft center 44C of the crankpin 44, is located on straight line L3. Then, the secondary inertia force F2B generated as the piston-crank mechanism 22 operates, acts in the direction opposite to the direction of point P1 with respect to the shaft center 33C of the crankshaft 33. Accordingly, the phase of the balancer 46A is set to a direction such that the inertia force F2A produced by the balancer 46A acts toward the shaft center 33C of the crankshaft 33 when point P1 is located on straight line L3.

4. Conditions for Reducing Secondary Inertia Couple

Next, the conditions for reducing the secondary inertia couple will be described. First, an inertia couple due to a lateral pressure from a piston will be described with reference to FIGS. 6 and 7.

Figure 6:
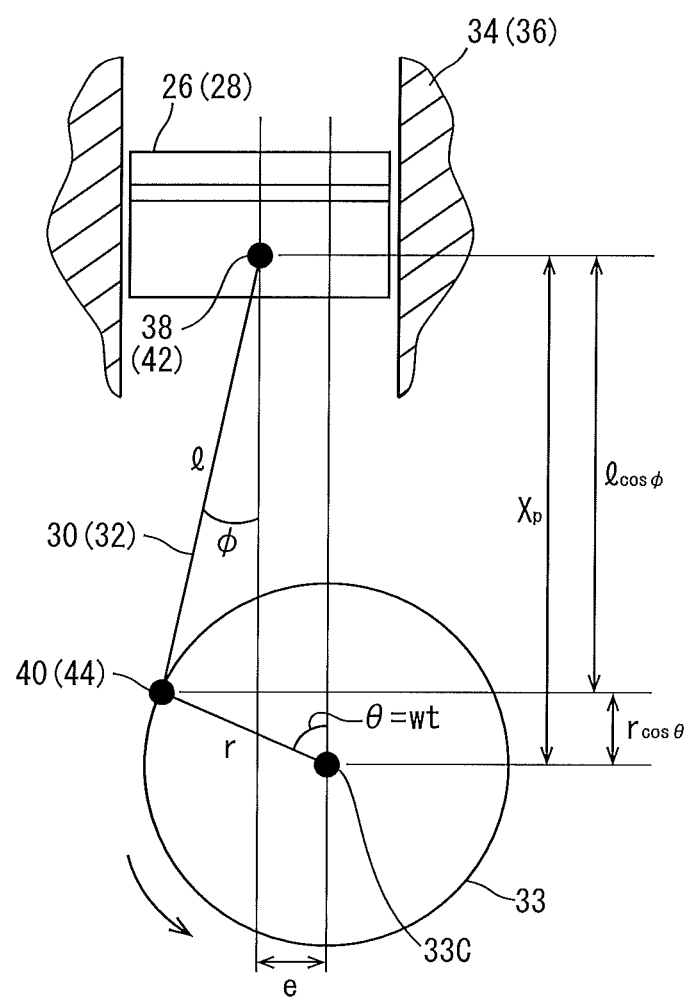
FIG. 6 is a conceptual diagram of the engine including a crankshaft with a shaft center offset from the cylinder axis.

Referring to FIG. 6, the relationship illustrated by the following equation is established for the offset quantity e, the length of the connecting rod 1, the crank radius r, the angle of crank rotation θ, and the swing angle of the connecting rod φ.

Formula 37

$$e + 1 \cdot \sin\phi = r \cdot \sin\theta \quad (37)$$

The offset quantity e is the sum of: (A) the offset quantity of the shaft center of the crankshaft relative to a straight line passing through the center of the cylinder as measured in the radial direction and extending in the axial direction of the cylinder; and (B) the offset quantity of the shaft center of the piston pin relative to this straight line. In the following description, the offset quantity e is the offset quantity of (A) only. Accordingly, FIG. 6 to which reference will be made illustrates the offset quantity of (A). In an engine in which the shaft center of the crankshaft is located on the cylinder axis, suitably the offset quantity e=0.

Rearranging the above equation of Formula 37 gives the following equation.

Formula 38

$$\sin\phi = \frac{r}{1} \cdot \sin\theta - \frac{e}{1} \quad (38)$$

Due to the Pythagorean proposition, the following equation is established.

Formula 39

$$\sin^2\phi + \cos^2\phi = 1 \quad (39)$$

From the above equations of Formulas 38 and 39, the following equation is derived.

Formula 40

$$\cos\phi = \sqrt{1 - \left(\frac{r}{l}\cdot\sin\theta - \frac{e}{l}\right)^2} \quad (40)$$

The above equation of Formula 40 is developed using the binomial theorem under the following conditions.

Formula 41

$$(a+b)^n = \sum_{k=0}^{n} \frac{n!}{k!(n-k)!}\cdot a^{n-k}\cdot b^k = \quad (41)$$

$$a^n + n\cdot a^{n-1}\cdot b + \frac{n(n-1)}{2\cdot 1}\cdot a^{n-2}\cdot b^2 + \ldots$$

Formula 42

$$a = 1 \quad (42)$$

Formula 43

$$b = -\left(\frac{r}{l}\cdot\sin\theta - \frac{e}{l}\right)^2 \quad (43)$$

Formula 44

$$n = \frac{1}{2} \quad (44)$$

As a result, the above equation of Formula 40 becomes as follows.

Formula 45

$$\cos\phi = 1 - \frac{1}{2}\cdot\left(\frac{r}{l}\cdot\sin\theta - \frac{e}{l}\right)^2 - \frac{1}{8}\cdot\left(\frac{r}{l}\cdot\sin\theta - \frac{e}{l}\right)^4 + \ldots \quad (45)$$

The first to third terms are extracted from the above equation of Formula 45 and the second and third terms are developed and tidied up, which gives the following equation.

Formula 46

$$\cos\phi \approx 1 - \frac{1}{2}\cdot\left(\frac{e}{l}\right)^2 - \frac{1}{8}\cdot\left(\frac{e}{l}\right)^4 + \frac{r\cdot e}{l^2}\cdot\sin\theta + \frac{r\cdot e^3}{2l^4}\cdot\sin\theta - \quad (46)$$

$$\frac{r^2}{2l^2}\cdot\sin^2\theta - \frac{3r^2\cdot e^2}{4l^4}\cdot\sin^2\theta + \frac{r^3\cdot e}{2l^4}\cdot\sin^3\theta - \frac{r^4}{8l^4}\cdot\sin^4\theta$$

Referring to FIG. 6, the displacement $x_p$ of the piston 26 (28) is expressed by the following equation.

Formula 47

$$x_p = r\cdot\cos\theta + l\cdot\cos\phi \quad (47)$$

Calculating the displacement $x_p$ of the piston 26 (28) using the above equations of Formulas 46 and 47 gives the following equation.

Formula 48

$$x_p \approx r\cdot\left\{\frac{1}{r} - \frac{e^2}{2l\cdot r} - \frac{e^4}{8l^3\cdot r} + \cos\theta + \left(\frac{e}{l} + \frac{e^3}{2l^3}\right)\cdot\sin\theta - \right. \quad (48)$$

$$\left. \frac{r}{2l}\cdot\left(1 + \frac{3e^2}{2l^2}\right)\cdot\sin^2\theta + \frac{r^2\cdot e}{2l^3}\cdot\sin^3\theta - \frac{r^3}{8l^3}\cdot\sin^4\theta\right\}$$

Tidying up the above equation of Formula 48 using the product-sum formula of trigonometric functions gives the following equation.

Formula 49

$$x_p \approx r\cdot\left(\frac{1}{r} - \frac{e^2}{2l\cdot r} - \frac{e^4}{8l^3\cdot r} - \frac{r}{4l} - \frac{3r\cdot e^2}{8l^3} - \frac{3r^3}{64l^3}\right) + \quad (49)$$

$$r\cdot\sqrt{1 + \left(\frac{e}{l} + \frac{3r^2\cdot e}{8l^3} + \frac{e^3}{2l^3}\right)^2}\cdot$$

$$\cos\left(\theta - \tan^{-1}\left(\frac{8l^2\cdot e + 3r^2\cdot e + 4e^3}{8l^3}\right)\right) +$$

$$r\cdot\left(\frac{r}{4l} + \frac{r^3}{16l^3} + \frac{3r\cdot e^2}{8l^3}\right)\cdot\cos 2\theta - r\cdot\frac{r^2\cdot e}{8l^3}\cdot\sin 3\theta - r\cdot\frac{r^3}{64l^3}\cdot\cos 4\theta$$

The velocity of the piston 26 (28), $v_p$, may be determined by differentiating the displacement $x_p$ with respect to time. If $\theta = \omega t$ in the above equation of Formula 49, the velocity $v_p$ is represented by the following equation.

Formula 50

$$v_p \approx -r\omega\cdot\sqrt{1 + \left(\frac{e}{l} + \frac{3r^2\cdot e}{8l^3} + \frac{e^3}{2l^3}\right)^2}\cdot \quad (50)$$

$$\sin\left(\omega t - \tan^{-1}\left(\frac{8l^2\cdot e + 3r^2\cdot e + 4e^3}{8l^3}\right)\right) -$$

$$r\omega\cdot\left(\frac{r}{2l} + \frac{r^3}{8l^3} + \frac{3r\cdot e^2}{4l^3}\right)\cdot\sin 2\omega t - r\omega\cdot\frac{3r^2\cdot e}{8l^3}\cdot\cos 3\omega t +$$

$$r\omega\cdot\frac{r^3}{16l^3}\cdot\sin 4\omega t$$

The acceleration of the piston 26 (28), $v_p$, may be determined by differentiating the velocity $v_p$ with respect to time. Differentiating the above equation of Formula 50 with respect to time gives the following equation.

Formula 51

$$a_p \approx -r\omega^2\cdot\sqrt{1 + \left(\frac{e}{l} + \frac{3r^2\cdot e}{8l^3} + \frac{e^3}{2l^3}\right)^2}\cdot \quad (51)$$

$$\cos\left(\omega t - \tan^{-1}\left(\frac{8l^2\cdot e + 3r^2\cdot e + 4e^3}{8l^3}\right)\right) -$$

$$r\omega^2\cdot\left(\frac{r}{l} + \frac{r^3}{4l^3} + \frac{3r\cdot e^2}{2l^3}\right)\cdot\cos 2\omega t + r\omega^2\cdot\frac{9r^2\cdot e}{8l^3}\cdot\sin 3\omega t +$$

$$r\omega^2\cdot\frac{r^3}{4l^3}\cdot\cos 4\omega t$$

The inertia force is obtained by multiplying mass by acceleration. Based on the above equation of Formula 51, the inertia force due to the reciprocating motion mass is represented by the following equation.

Formula 52

$$\frac{F}{mr\omega^2} = \frac{-a_P}{r\omega^2} \approx \sqrt{1 + \left(\frac{e}{1} + \frac{3r^2 \cdot e}{8l^3} + \frac{e^3}{2l^3}\right)^2} \cdot \cos\left(\omega t - \tan^{-1}\left(\frac{8l^2 \cdot e + 3r^2 \cdot e + 4e^3}{8l^3}\right)\right) + \left(\frac{r}{1} + \frac{r^3}{4l^3} + \frac{3r \cdot e^2}{2l^3}\right) \cdot \cos 2\omega t - \frac{9r^2 \cdot e}{8l^3} \cdot \sin 3\omega t - \frac{r^3}{4l^3} \cdot \cos 4\omega t \quad (52)$$

Figure 7:
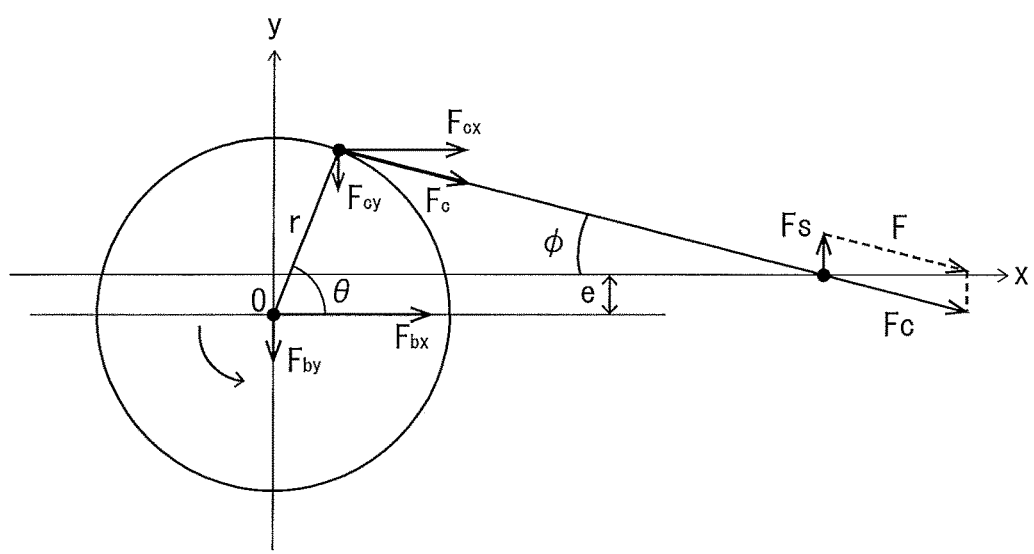
FIG. 7 is a conceptual diagram illustrating the inertia couple in an engine including a crankshaft with a shaft center offset from the cylinder axis.

Referring to FIG. 7, the inertia force F acting on the position of the piston 26 (28) (more specifically, the position of the piston pin) can be resolved into the force Fc acting on the connecting rod 30 (32) and the force Fs acting on the side wall of the cylinder 34 (36). The relationships illustrated by the following equations exist between the forces Fc and F and between the forces Fs and F.

Formula 53

$$F_c = \frac{F}{\cos\phi} \quad (53)$$

Formula 54

$$F_s = F_c \cdot \sin\phi = F \cdot \tan\phi \quad (54)$$

The force acting on the crankshaft 33 can be resolved into a component in the x-direction, Fbx, and a component in the y-direction, Fby, as shown in FIG. 7. Fbx and Fby are determined by the following equations.

Formula 55

$$F_{bx} = F_{cx} = F_c \cdot \cos\phi = F \quad (55)$$

Formula 56

$$F_{by} = F_{cy} = -F_c \cdot \sin\phi = -F \cdot \tan\phi = -F_s \quad (56)$$

Referring to FIG. 7, the forces Fs and Fby form a couple. As will be apparent from the above equations of Formulas 55 and 56, the above couple is caused by the inertia force acting on the piston 26 (28). Such an inertia force will be hereinafter referred to as inertia couple. The inertia couple Mrz can be determined by the following equation.

Formula 57

$$Mrz = F \cdot \tan\phi(r \cdot \cos\theta + l \cdot \cos\phi) \quad (57)$$

Tidying up the right side of the above equation of Formula 57 gives the following equation.

Formula 58

$$Mrz = F \cdot (r \cdot \cos\theta \cdot \sin\phi + l \cdot \sin\phi \cdot \cos\phi) \cdot \frac{1}{\cos\phi} \quad (58)$$

Referring to FIG. 7, the following equation is derived.

Formula 59

$$l \cdot \sin\phi = r \cdot \sin\theta - e \quad (59)$$

Tidying up the above equation of Formula 58 using the above equation of Formula 59 gives the following equation.

Formula 60

$$Mrz = F \cdot r \cdot \frac{\sin(\theta + \phi)}{\cos\phi} - F \cdot e \quad (60)$$

Referring to FIG. 7, the position $x_p$ of the piston 26 (28) is represented by the above equation of Formula 47.

Differentiating the above position $x_p$ with respect to time t where $\theta = \omega t$ and $\varphi$ is a function of time t (i.e. $\varphi = \varphi(t)$) gives the following equation.

Formula 61

$$v_p = \frac{dx_p}{dt} = -(r \cdot \omega \cdot \sin\theta + l \cdot \phi' \cdot \sin\phi) \quad (61)$$

Differentiating both sides of the above equation of Formula 59 with respect to time t gives the following equation.

Formula 62

$$l \cdot \phi' \cos\phi = r \cdot \omega \cdot \cos\theta \quad (62)$$

Tidying up the above equation of Formula 62 gives the following equation.

Formula 63

$$l \cdot \phi' = \frac{r \cdot \omega \cdot \cos\theta}{\cos\phi} \quad (63)$$

Tidying up the above equation of Formula 61 using the above equation of Formula 63 gives the following equation.

Formula 64

$$v_p = -r \cdot \omega \cdot \frac{\sin(\theta + \phi)}{\cos\phi} \quad (64)$$

Tidying up the above equation of Formula 64 gives the following equation.

Formula 65

$$r \cdot \frac{\sin(\theta + \phi)}{\cos\phi} = -\frac{v_p}{\omega} \quad (65)$$

Tidying up the above equation of Formula 60 using the above equation of Formula 65 gives the following equation.

Formula 66

$$Mrz = -F \cdot \left(\frac{v_p}{\omega} + e\right) \quad (66)$$

Using the above equation of Formula 51 to express the inertia force $F_p$ due to the reciprocating motion mass gives the following equation.

Formula 67

$$F_p = -m \cdot a_p \approx m \cdot r \cdot \omega^2 \cdot \sqrt{1 + \left(\frac{e}{l} + \frac{3r^2 \cdot e}{8l^3} + \frac{e^3}{2l^3}\right)^2} \cdot \cos\left(\omega t - \tan^{-1}\left(\frac{8l^2 \cdot e + 3r^2 \cdot e + 4e^3}{8l^3}\right)\right) + m \cdot r \cdot \omega^2 \cdot \left(\frac{r}{l} + \frac{r^3}{4l^3} + \frac{3r \cdot e^2}{2l^3}\right) \cdot \cos 2\omega t - m \cdot r \cdot \omega^2 \cdot \frac{9r^2 \cdot e}{8l^3} \cdot \sin 3\omega t - m \cdot r \cdot \omega^2 \cdot \frac{r^3}{4l^3} \cdot \cos 4\omega t \quad (67)$$

The velocity $v_p$ of the piston 26 (28) is expressed by the above equation of Formula 50.

The symbols are defined as follows.

Formula 68

$$\lambda = \frac{l}{r} \quad (68)$$

Formula 69

$$\xi = \frac{e}{r} \quad (69)$$

Formula 70

$$\varepsilon = \sqrt{1 + \left(\frac{e}{l} + \frac{3r^2 \cdot e}{8l^3} + \frac{e^3}{2l^3}\right)^2} \quad (70)$$

Formula 71

$$\tau = \tan^{-1}\left(\frac{8l^2 \cdot e + 3r^2 \cdot e + 4e^3}{8l^3}\right) \quad (71)$$

Formula 72

$$\mu = \frac{r}{l} + \frac{r^3}{4l^3} + \frac{3r \cdot e^2}{2l^3} \quad (72)$$

Formula 73

$$\eta = \frac{9r^2 \cdot e}{8l^3} \quad (73)$$

Formula 74

$$\varepsilon \cdot \cos\tau = 1 \quad (74)$$

Formula 75

$$\varepsilon \cdot \sin\tau = \tan\tau = \sqrt{\varepsilon^2 - 1} = \frac{e}{l} + \frac{3r^2 \cdot e}{8l^3} + \frac{e^3}{2l^3} \quad (75)$$

Tidying up the equation for the inertia couple Mrz using the above equations of Formulas 68 to 75 gives the following equation.

Formula 76

$$\frac{Mrz}{m \cdot r^2 \cdot \omega^2} = -\frac{F}{m \cdot r^2 \cdot \omega^2}\left(\frac{v}{\omega} + e\right) = \frac{F}{m \cdot r \cdot \omega^2}\left(-\frac{e}{r} - \frac{v}{r \cdot \omega}\right) \approx \left\{\varepsilon \cdot \cos(\omega t - \tau) + \mu \cdot \cos 2\omega t - \eta \cdot \sin 3\omega t - \frac{1}{4\lambda^3} \cdot \cos 4\omega t\right\} \cdot \left\{-\xi + \varepsilon \cdot \sin(\omega t - \tau) + \frac{\mu}{2} \cdot \sin 2\omega t + \frac{\eta}{3} \cdot \cos 3\omega t - \frac{1}{16\lambda^3} \cdot \sin 4\omega t\right\} \quad (76)$$

Developing the above equation of Formula 76 and tidying up using the product-sum formula of trigonometric functions gives the following equation.

Formula 77

$$\frac{Mrz}{m \cdot r^2 \cdot \omega^2} \approx -\frac{\varepsilon \cdot \mu}{4} \cdot \sin(\omega t + \tau) - \left(\frac{\mu \cdot \eta}{12} + \frac{\eta}{96\lambda^3}\right) \cdot \cos\omega t - \varepsilon \cdot \xi \cdot \cos(\omega t - \tau) + \frac{\varepsilon^2}{2} \cdot \sin(2\omega t - 2\tau) + \frac{\mu}{32\lambda^3} \cdot \sin 2\omega t - \frac{\varepsilon \cdot \eta}{3} \cdot \cos(2\omega t + \tau) - \xi \cdot \mu \cdot \cos 2\omega t + \frac{3\varepsilon \cdot \mu}{4} \cdot \sin(3\omega t - \tau) + \frac{3\varepsilon}{32\lambda^3} \cdot \sin(3\omega t + \tau) + \xi \cdot \eta \cdot \sin 3\omega t + \frac{\mu^2}{4} \cdot \sin 4\omega t + \frac{2\varepsilon \cdot \eta}{3} \cdot \cos(4\omega t - \tau) + \frac{\xi}{4\lambda^3} \cdot \cos 4\omega t - \frac{5\varepsilon}{32\lambda^3} \cdot \sin(5\omega t - \tau) + \frac{5\mu \cdot \eta}{12} \cdot \cos 5\omega t - \left(\frac{\eta^2}{6} + \frac{3\mu}{32\lambda^3}\right) \cdot \sin 6\omega t - \frac{7\eta}{96\lambda^3} \cdot \cos 7\omega t + \frac{1}{128\lambda^6} \cdot \sin 8\omega t \quad (77)$$

Expressing μ using λ and ξ gives the following equation.

Formula 78

$$\mu = \frac{1}{\lambda} + \frac{1}{4\lambda^3} + \frac{3\xi^2}{2\lambda^3} \quad (78)$$

Expressing η using λ and ξ gives the following equation.

Formula 79

$$\eta = \frac{9\xi}{8\lambda^3} \quad (79)$$

The above equation of Formula 77 is tidied up using the above equations of Formulas 78 and 79. As a result, the secondary component is expressed by the following equation.

Formula 80

$$\frac{Mrz2}{m \cdot r^2 \cdot \omega^2} \approx \frac{\varepsilon^2}{2} \cdot \sin(2\omega t - 2\tau) - \left(\frac{\xi}{\lambda} + \frac{\xi}{4\lambda^3} + \frac{3\xi^3}{2\lambda^3}\right) \cdot \cos 2\omega t - \frac{3\varepsilon - \xi}{8\lambda^3} \cdot \cos(2\omega t + \tau) + \left(\frac{1}{32\lambda^4} + \frac{1}{128\lambda^6} + \frac{3\xi^2}{64\lambda^6}\right) \cdot \sin 2\omega t \quad (80)$$

The above equation of Formula 80 is tidied up using the trigonometric function formula to give the following equation.

Formula 81

$$\frac{Mrz2}{m \cdot r^2 \cdot \omega^2} \approx \left[\frac{\varepsilon^2}{2} \cdot \cos 2\tau + \frac{3\varepsilon \cdot \xi}{8\lambda^3} \cdot \sin\tau + \frac{1}{32\lambda^3}\left(\frac{1}{\lambda} + \frac{1}{4\lambda^3} + \frac{3\xi^2}{2\lambda^3}\right)\right] \cdot \sin 2\omega t - \left[\frac{\varepsilon^2}{2} \cdot \sin 2\tau + \frac{3\varepsilon \cdot \xi}{8\lambda^3} \cdot \cos\tau + \xi \cdot \left(\frac{1}{\lambda} + \frac{1}{4\lambda^3} + \frac{3\xi^2}{2\lambda^3}\right)\right] \cdot \cos 2\omega t \quad (81)$$

Further tidying up the above equation of Formula 81 gives the following equation.

Formula 82

$$\frac{Mrz2}{m \cdot r^2 \cdot \omega^2} \approx \sqrt{\left(\frac{\varepsilon^2}{2} \cdot \cos 2\tau + \frac{3\varepsilon \cdot \xi}{8\lambda^3} \cdot \sin \tau + \left(\frac{1}{32\lambda^4} + \frac{1}{128\lambda^6} + \frac{3\xi^2}{64\lambda^6}\right)\right)^2 + \left(\frac{\varepsilon^2}{2} \cdot \sin 2\tau + \frac{3\varepsilon \cdot \xi}{8\lambda^3} \cdot \cos \tau + \left(\frac{\xi}{\lambda} + \frac{\xi}{4\lambda^3} + \frac{3\xi^3}{2\lambda^3}\right)\right)^2} \quad (82)$$

$$\sin\left(\tan^{-1}\left(\frac{\frac{\varepsilon^2}{2} \cdot \sin 2\tau + \frac{3\varepsilon \cdot \xi}{8\lambda^3} \cdot \cos \tau + \left(\frac{\xi}{\lambda} + \frac{\xi}{4\lambda^3} + \frac{3\xi^3}{2\lambda^3}\right)}{\frac{\varepsilon^2}{2} \cdot \cos 2\tau + \frac{3\varepsilon \cdot \xi}{8\lambda^3} \cdot \sin \tau + \left(\frac{1}{32\lambda^4} + \frac{1}{128\lambda^6} + \frac{3\xi^2}{64\lambda^6}\right)}\right)\right)$$

The above equation of Formula 82 expresses the secondary inertia couple due to the lateral pressure from a single piston generated as this single piston operates. In the engine 14, the resultant force of the secondary inertia couple due to the lateral pressure from the piston 26 generated as the piston 26 operates and the secondary inertia couple due to the lateral pressure from the piston 28 generated as the piston 28 operates (i.e., combined couple) acts on the crankshaft 33.

FIGS. 8A to 8D illustrate the relationship between the secondary inertia couple F21C caused by the operation of the piston 26, the secondary inertia couple F22C caused by the operation of the piston 28, the inertia force F2A produced by the balancer 46A, and the secondary inertia force F2B generated by the operation of the piston-crank mechanism 22.

A secondary inertia couple due to a lateral pressure from a piston is mainly generated by the primary translational inertia force. Thus, when the piston is within a range of 90° having the top dead center in the middle, an upward force acts; when the piston is within a range of 90° having the bottom dead center in the middle, a downward force acts. Thus, when the piston is within a range of 90° having the top dead center in the middle, the piston pushes the side wall of the cylinder in a direction that reduces the inclination of the connecting rod; when the piston is within a range of 90° having the bottom dead center in the middle, the piston pushes the side wall of the cylinder in a direction that increases the inclination of the connecting rod.

As shown in FIGS. 8A to 8D, the inertia force F2A produced by the balancer 46A and the secondary inertia force F2B generated by the operation of the piston-crank mechanism 22 form a couple. This couple, the secondary inertia couple F21C caused by the operation of the piston 26, and the secondary inertia couple F22C caused by the operation of the piston 28 must be balanced such that the total is zero.

Figure 8A:
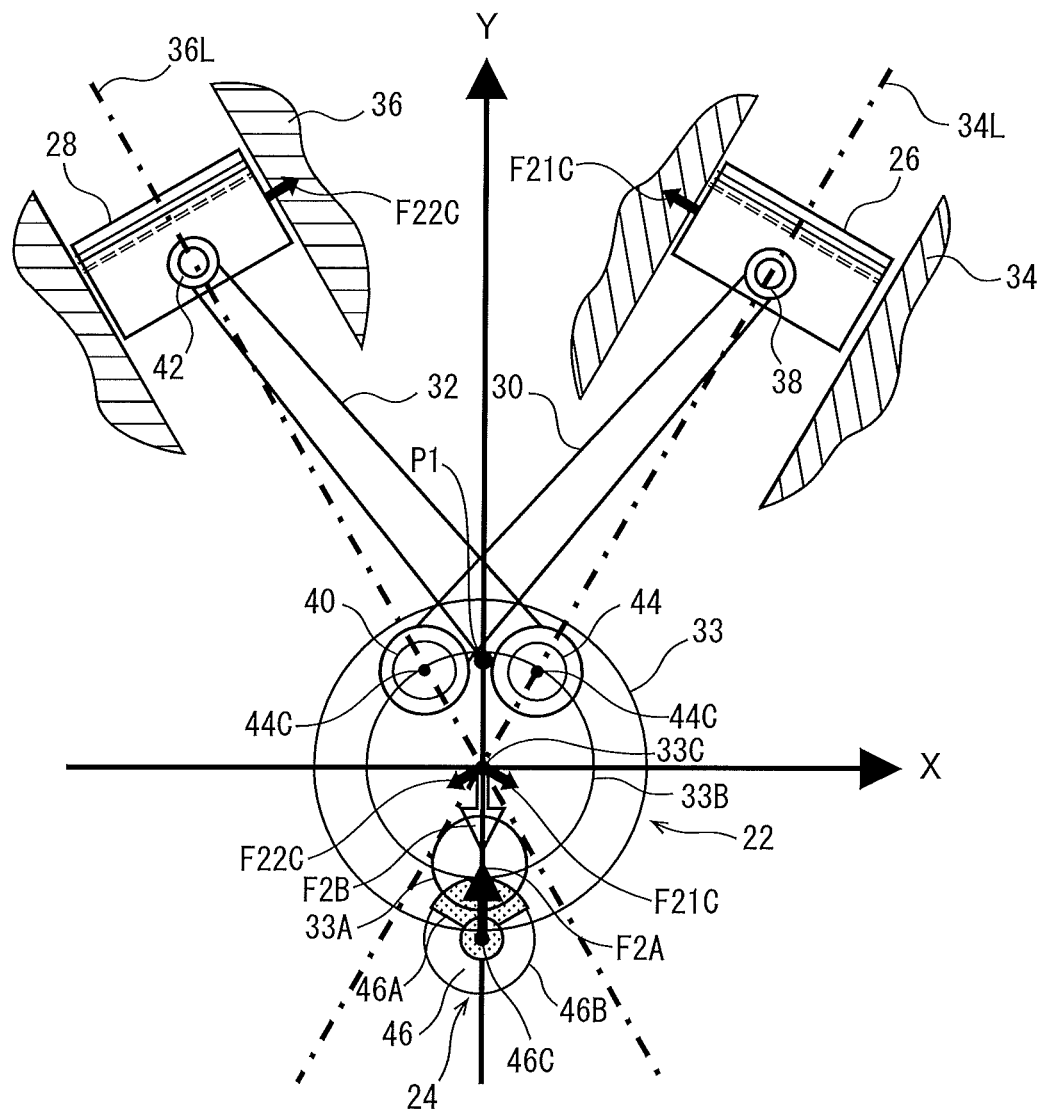
FIG. 8A is a schematic view illustrating the relationship between the secondary inertia couple caused by the lateral pressures from the pistons, the secondary inertia force caused as the piston-crank mechanism operates, and the inertia force produced by the balancer, where point P1 is at the reference position.

In FIG. 8A, the secondary inertia couple F21C caused by the operation of the piston 26 and the secondary inertia couple F22C caused by the operation of the piston 28 are in balance. At this time, the inertia force F2A produced by the balancer 46A and the secondary inertia force F2B generated by the operation of the piston-crank mechanism 22 act in opposite directions that define one straight line. Thus, it is zero when considered as a couple. As a result, the three couples are in balance as a whole.

Figure 8B:
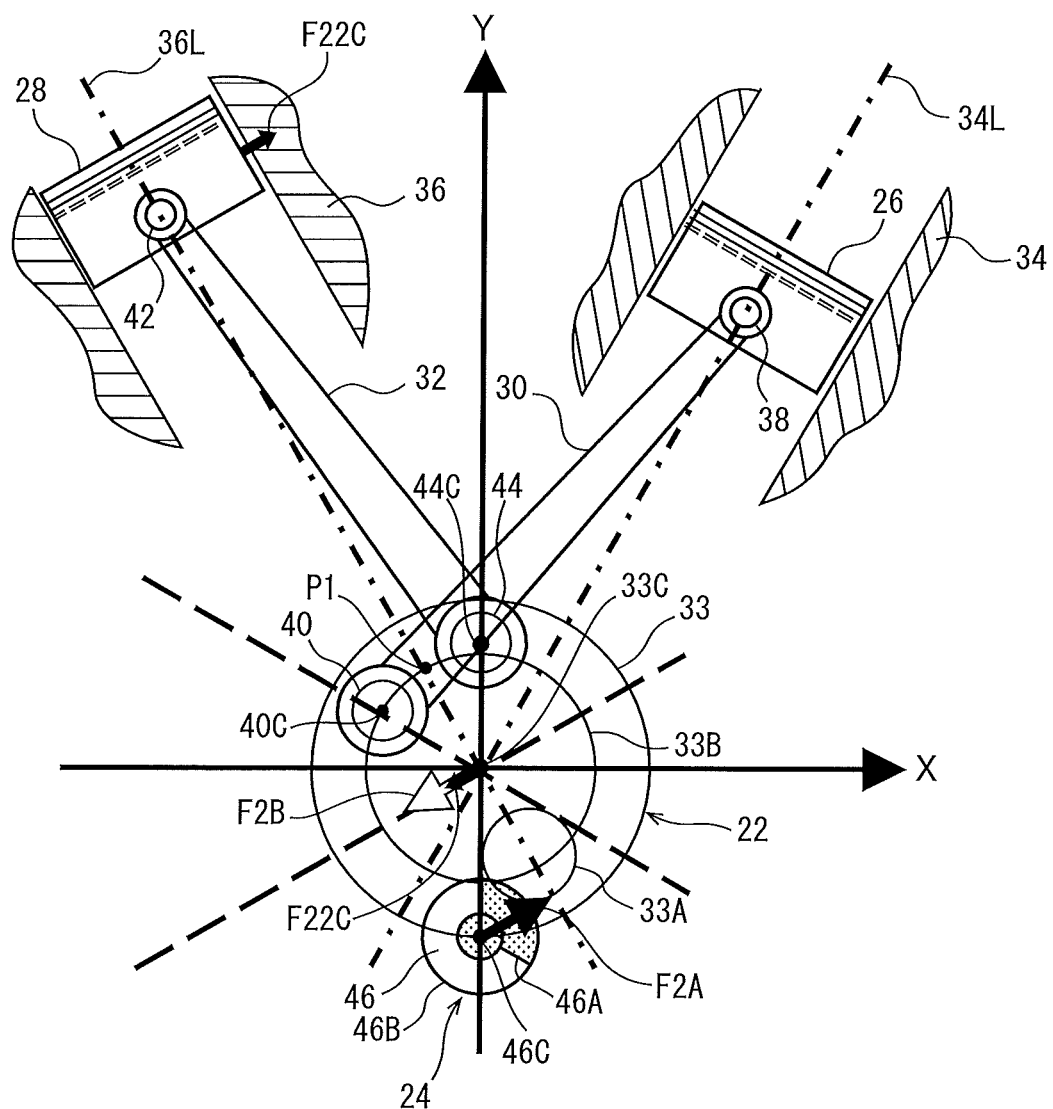
FIG. 8B is a schematic view illustrating the relationship between the secondary inertia couple caused by the lateral pressures from the pistons, the secondary inertia force generated as the piston-crank mechanism operates, and the inertia force produced by the balancer, where point P1 has advanced by 30° in the direction of crank rotation from its position shown in FIG. 8A.
Figure 8C:
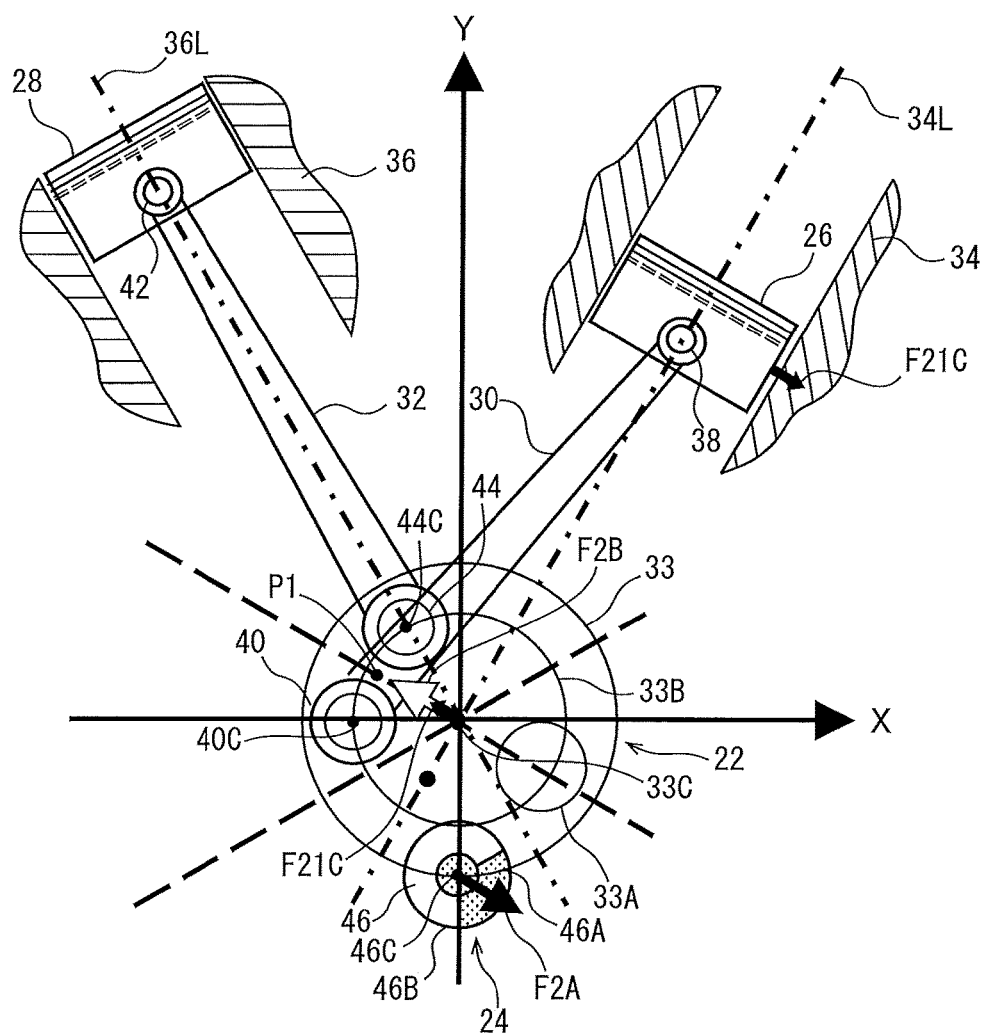
FIG. 8C is a schematic view illustrating the relationship between the secondary inertia couple caused by the lateral pressures from the pistons, the secondary inertia force generated as the piston-crank mechanism operates, and the inertia force produced by the balancer, where point P1 has advanced by 60° in the direction of crank rotation from its position shown in FIG. 8A.
Figure 8D:
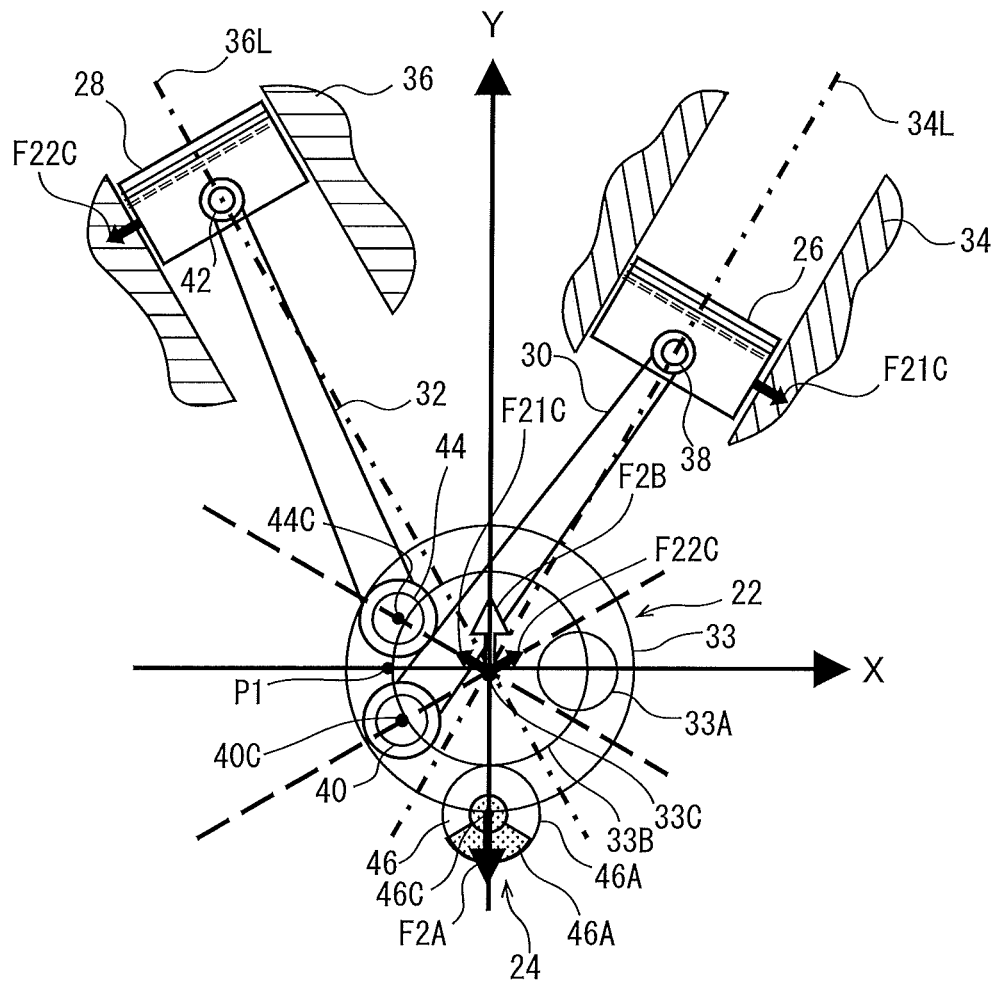
FIG. 8D is a schematic view illustrating the relationship between the secondary inertia couple caused by the lateral pressures on the pistons, the secondary inertia force generated as the piston-crank mechanism operates, and the inertia force produced by the balancer, where point P1 has advanced by 90° in the direction of crank rotation from its position shown in FIG. 8A.

In FIG. 8B, the piston 26 is at a position of 90° from the top dead center. Thus, the secondary inertia couple F21C caused by the operation of the piston 26 is zero. At this time, point P1 has rotated by about 30° from the reference position such that the balancer 46A has rotated by about 60° in the direction opposite to the direction in which the crankshaft 33 rotates. The direction of the inertia force F2A is perpendicular or substantially perpendicular to the cylinder axis 36L. The secondary inertia force F2B generated as the piston-crank mechanism 22 operates, also acts in a direction perpendicular or substantially perpendicular to the cylinder axis 36L. The inertia force F2A and secondary inertia force F2B form a couple. The position of the balancer shaft 46 (i.e. its distance from the crankshaft 33 and its direction) is suitably decided such that that couple and the secondary inertia couple F22C caused by the operation of the piston 28 are in balance so as to be zero.

In the engine 14, the balancer shaft 46 is located at a position that satisfies the above conditions. That is, in the engine 14, the combined couple of the secondary inertia couple F21C caused by the lateral pressure from the piston 26 and the secondary inertia couple F22C caused by the lateral pressure from the piston 28 is reduced. As a result, in the engine 14, vibration caused by the combined couple of the secondary inertia couple F21C caused by the lateral pressure from the piston 26 and the secondary inertia couple F22C caused by the lateral pressure from the piston 28 is reduced.

Figure 9:
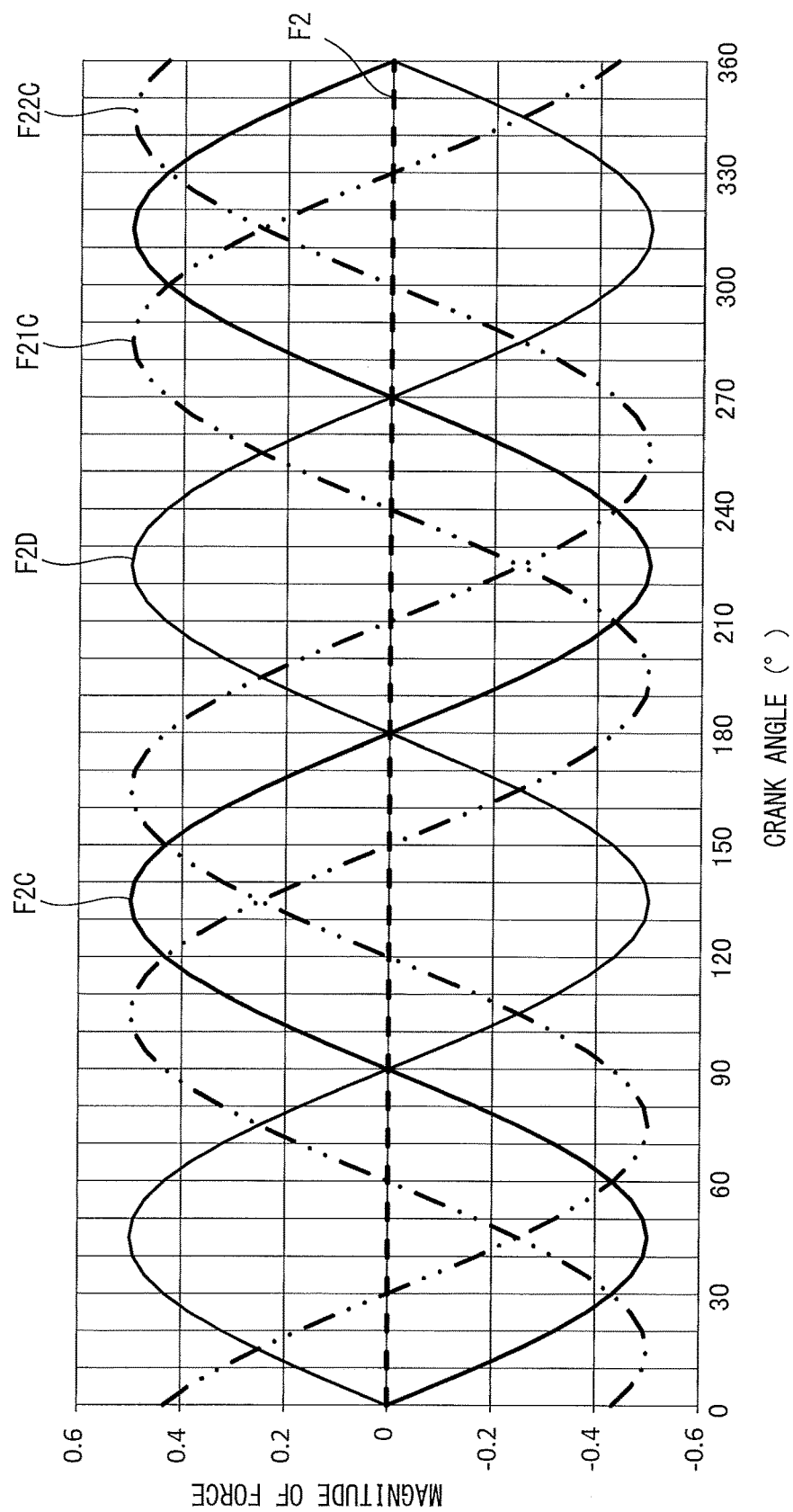
FIG. 9 shows the result of a simulation illustrating the relationship between the magnitude of the secondary inertia couple and the crank angle, where $\alpha=\beta=60°$.

FIG. 9 shows the result of a simulation illustrating the relationship between the magnitude of the secondary inertia couple and the crank angle. More specifically, FIG. 9 illustrates the relationship between the magnitude of the secondary inertia couple F21C caused by the operation of the piston 26, the magnitude of the secondary inertia couple F22C caused by the operation of the piston 28, the magnitude of the combined couple F2C of these secondary inertia couples F21C and F22C, the magnitude of the couple (i.e. secondary inertia couple) F2D due to the inertia force F2A produced by the balancer 46A and the secondary inertia force F2B generated as the piston-crank mechanism 22 operates, the magnitude of the combined couple F2 of the combined couple F2C and the secondary inertia couple F2D, and the crank angle, where α=β=60°. The crank angle is measured relative to the value obtained when point P1 described above is located on straight line L3 at the position closer to the piston.

The phase of the inertia force F2A produced by the balancer 46A, i.e., the direction of the balancer 46A associated with a given crank angle, is dependent on the bank angle and the phase difference of the crankpins. Adjusting the positioning of the balancer 46A adjusts the phase of the secondary inertia couple F2D.

As shown in FIG. 9, the phase of the secondary inertia couple F2D may be opposite to the phase of the combined couple F2C to reduce the combined couple F2C of the secondary inertia couples F21C and F22C, as indicated by the combined couple F2. This reduces vibration caused by the combined couple F2C.

In the above-illustrated engine 14, the balancer 46 is located below the crankshaft 33. This lowers the center of gravity of the engine 14.

Although β=60° in the above-illustrated engine 14, β may have other values.

Figure 10:
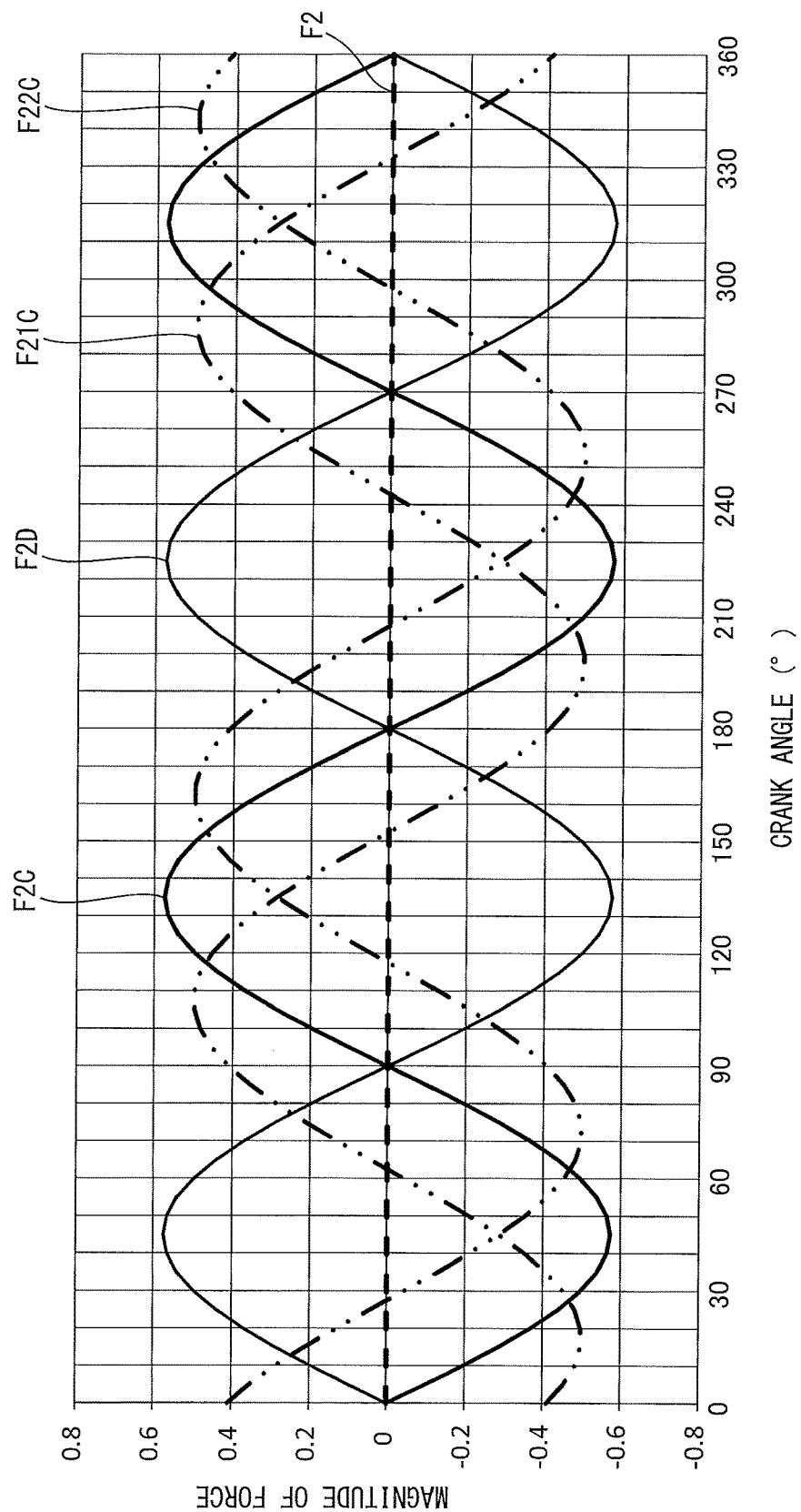
FIG. 10 shows the result of a simulation illustrating the relationship between the magnitude of the secondary inertia couple and the crank angle, where $\beta=55°$ and $\alpha=70°$.
Figure 11:
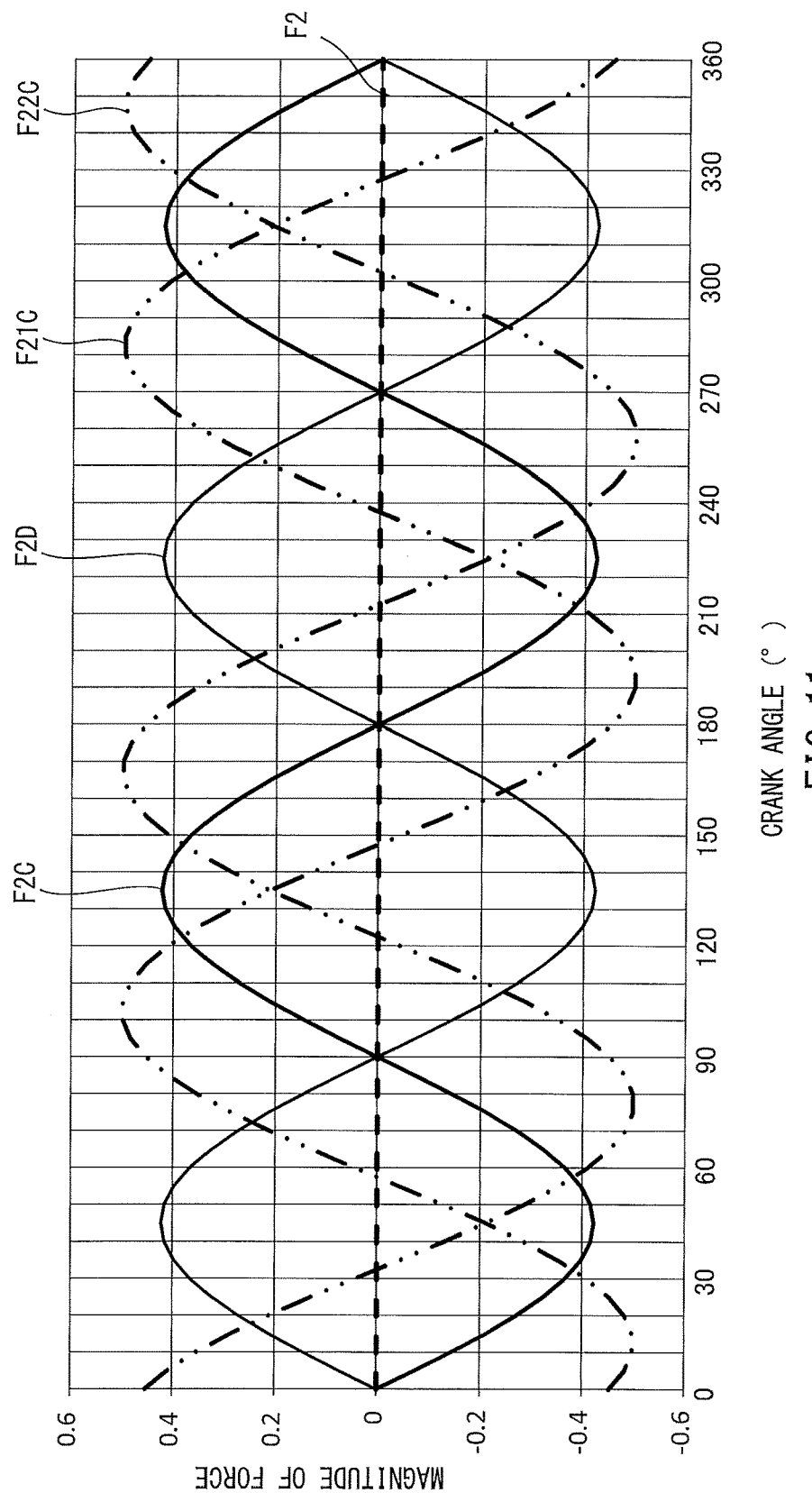
FIG. 11 shows the result of a simulation illustrating the relationship between the magnitude of the secondary inertia couple and the crank angle, where $\beta=65°$ and $\alpha=50°$.
Figure 12:
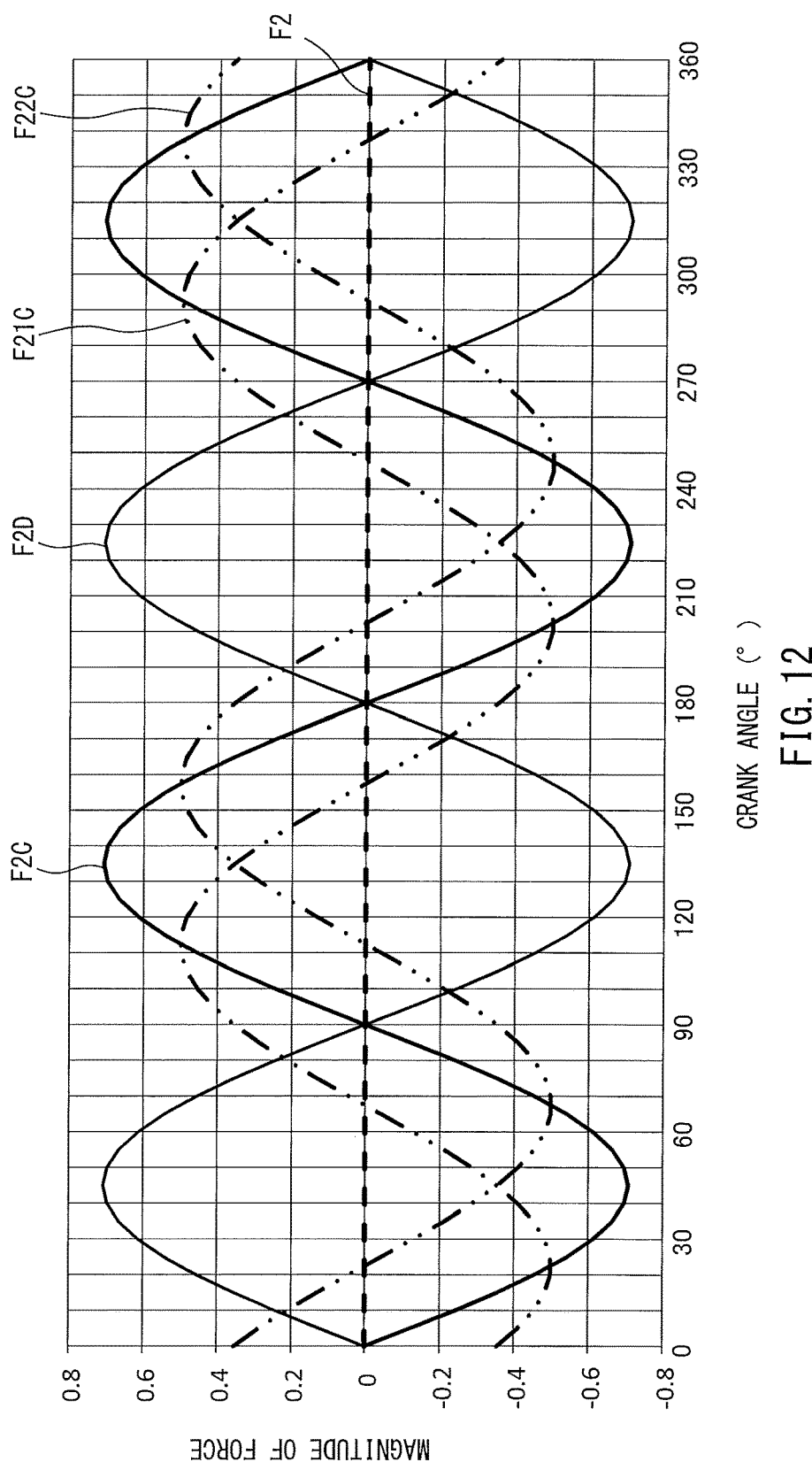
FIG. 12 shows the result of a simulation illustrating the relationship between the magnitude of the secondary inertia couple and the crank angle, where $\beta=45°$ and $\alpha=90°$.
Figure 13:
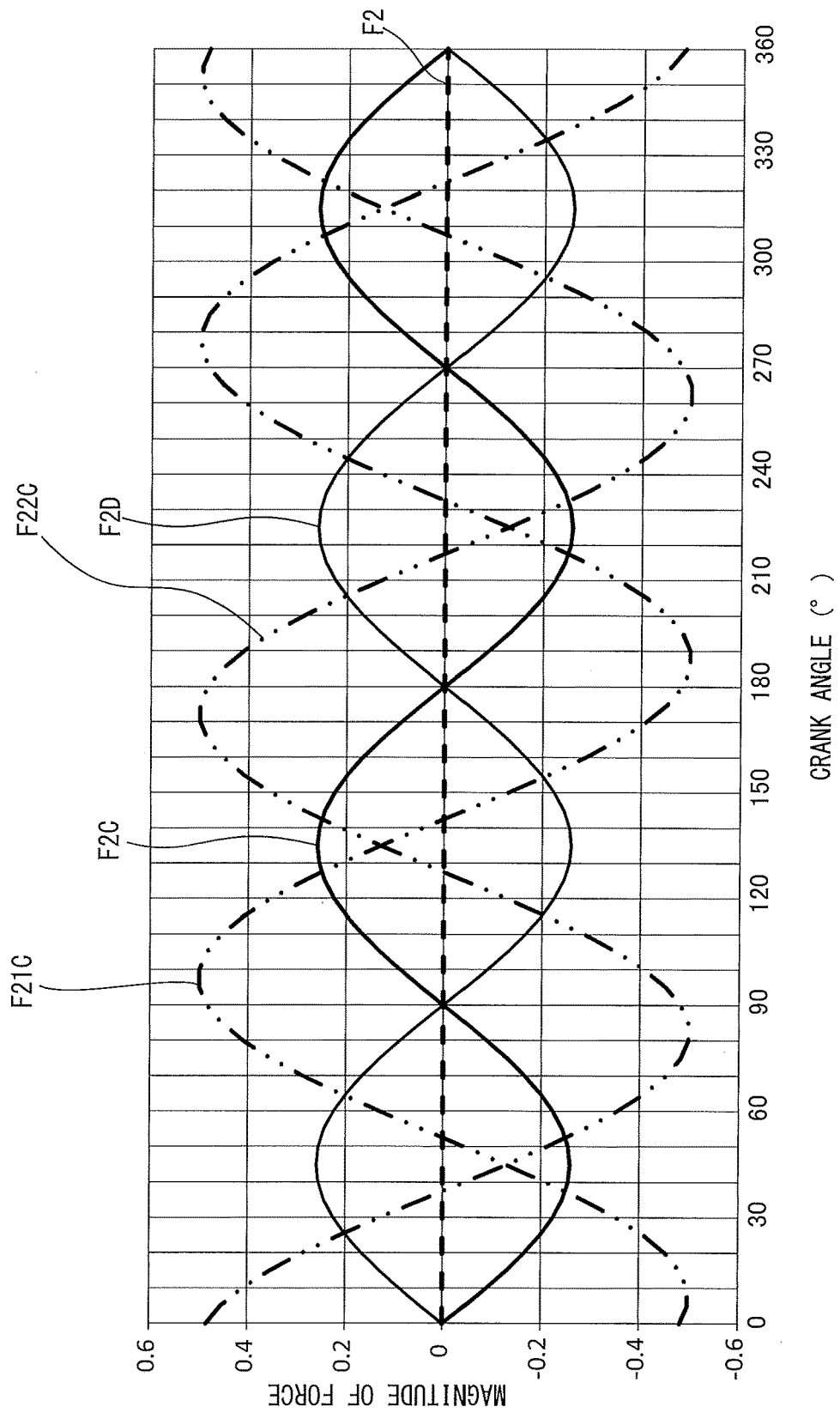
FIG. 13 shows the result of a simulation illustrating the relationship between the magnitude of the secondary inertia couple and the crank angle, where $\beta=75°$ and $\alpha=30°$.

Similar to FIG. 9, FIGS. 10 to 13 show the results of simulations illustrating the relationship between the magnitude of the secondary inertia couple and the crank angle. FIG. 10 illustrates an implementation where β=55° and α=70°. FIG. 11 illustrates an implementation where β=65° and α=50°. FIG. 12 illustrates an implementation where β=45° and α=90°. FIG. 13 illustrates an implementation where $\beta=75°$ and $\alpha=30°$. As shown in FIGS. 10 to 13, vibration is able to be reduced even when $\beta$ has values other than about 60°.

$\beta$ is preferably in the range of about 45° to about 75°, and more preferably in the range of about 55° to about 65°, for example. $\beta$ is preferably in the range of about 45° to about 75°, for example, for the following reasons.

Even when the bank angle $\beta$ is changed, the combined couple F2C of the secondary inertia couples F21C and F22C is able to be made zero by adjusting the position of the balancer shaft 46. However, if the bank angle $\beta$ is changed, the shape of the secondary inertia force F2B generated by the operation of the piston-crank mechanism 22 (i.e., locus of the end point of the vector) is less perfectly circular. Thus, the secondary inertia force F2B generated by the operation of the piston-crank mechanism 22 and the inertia force produced by the balancer 46A (which has the same magnitude for all the directions) are not in balance. As a result, the secondary inertia force F2B, which is a translational force, is not zero.

Thus, if the bank angle $\beta$ is changed, the secondary inertia force F2B which is a translational force is left. However, reducing the secondary inertia force F2B by about 50% or more, for example, is effective in reducing vibration. If $\beta$ is in the range of about 45° to about 75°, the secondary inertia force F2B is reduced by about 50% or more, for example. Reducing the secondary inertia force F2B by about 50% or more means reducing the secondary inertia force F2B in the x- or y-direction in FIG. 3 by about 50% or more, for example.

Figure 14:
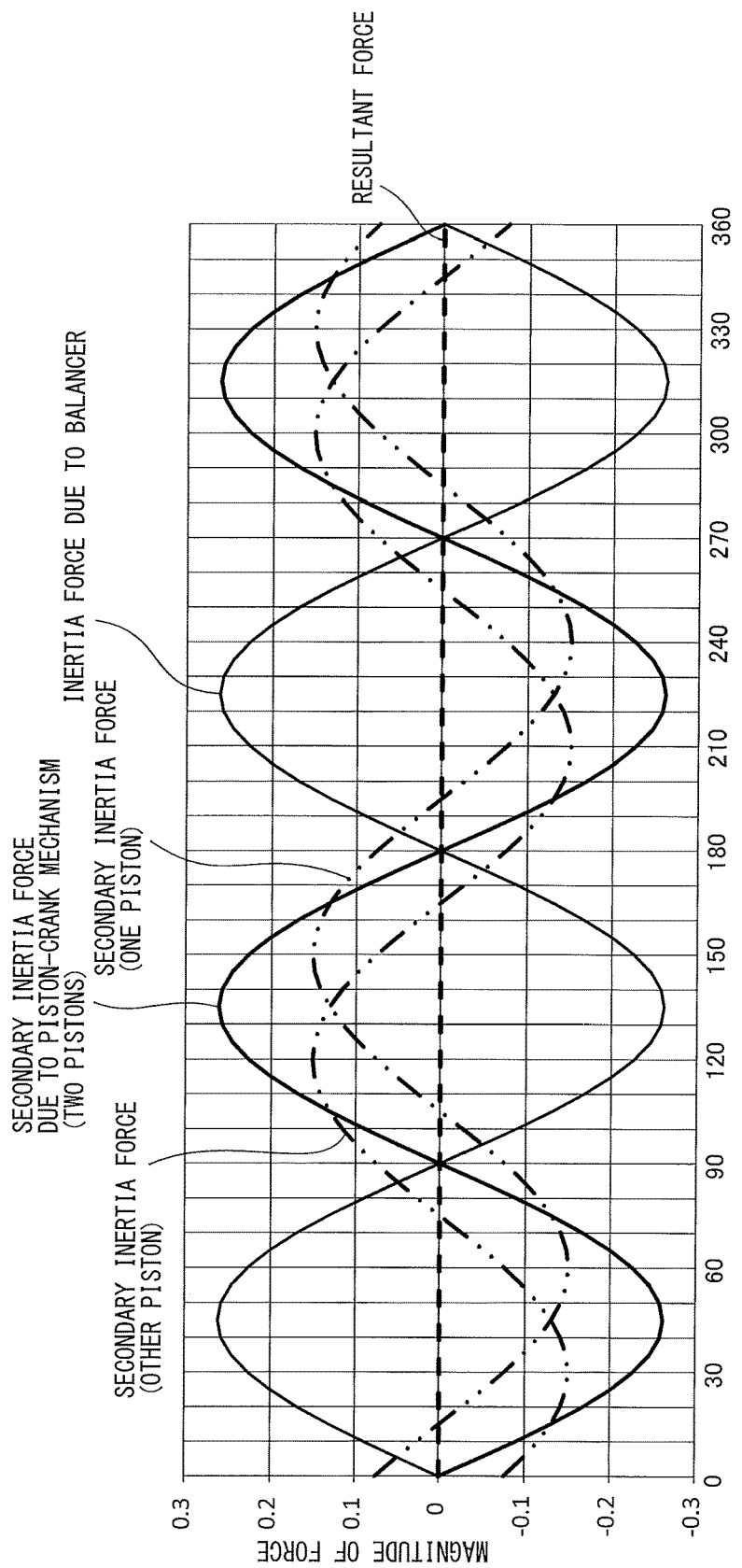
FIG. 14 shows the result of a simulation illustrating the relationship between the secondary inertia force generated by the operation of the piston-crank mechanism, the inertia force produced by the balancer, and their resultant force, where these inertia forces are measured in the x-direction, where $\alpha=\beta=60°$.
Figure 15:
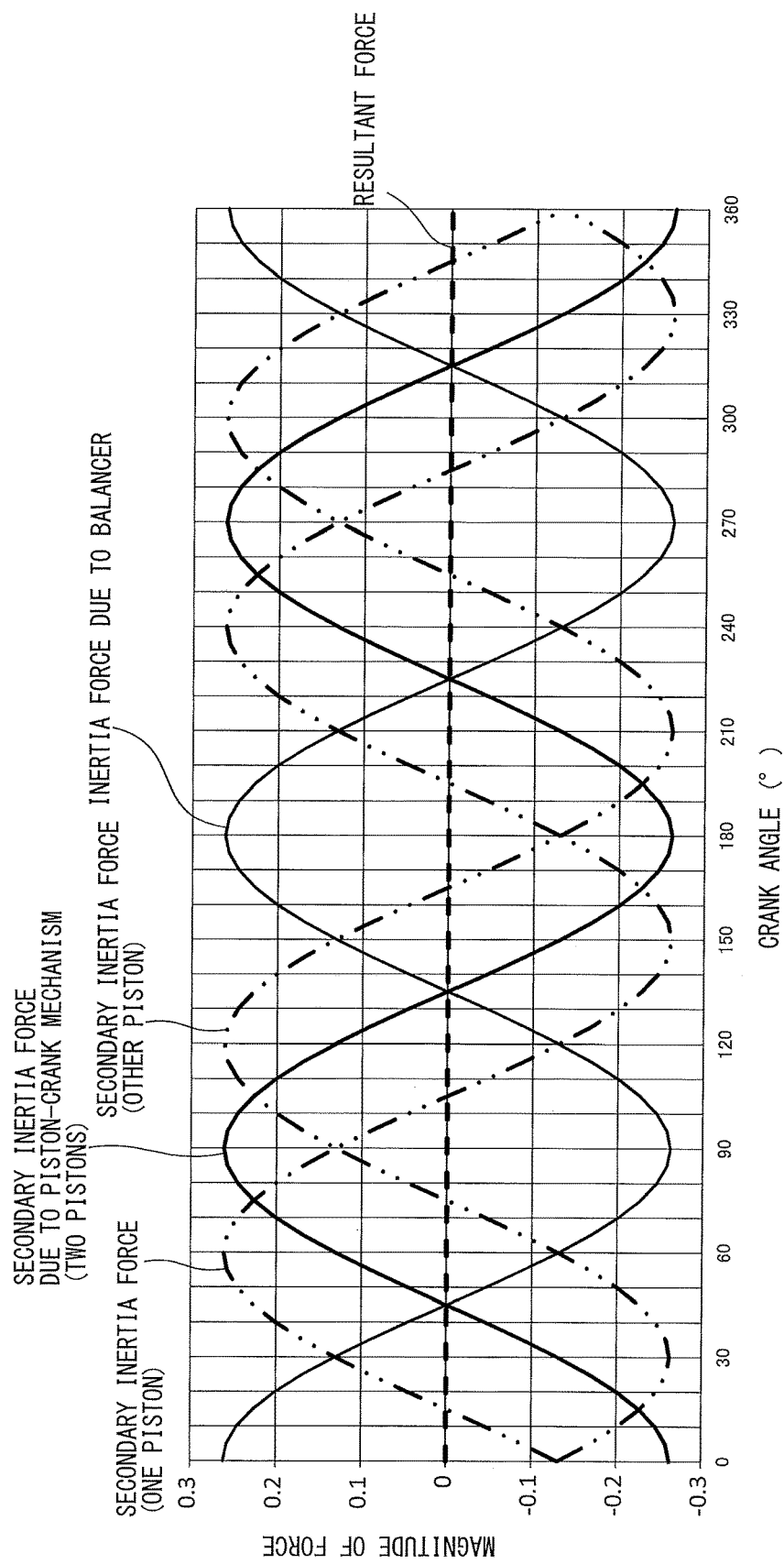
FIG. 15 shows the result of a simulation illustrating the relationship between the secondary inertia force generated by the operation of the piston-crank mechanism, the inertia force produced by the balancer, and their resultant force, where these inertia forces are measured in the y-direction, where $\alpha=\beta=60°$.
Figure 16:
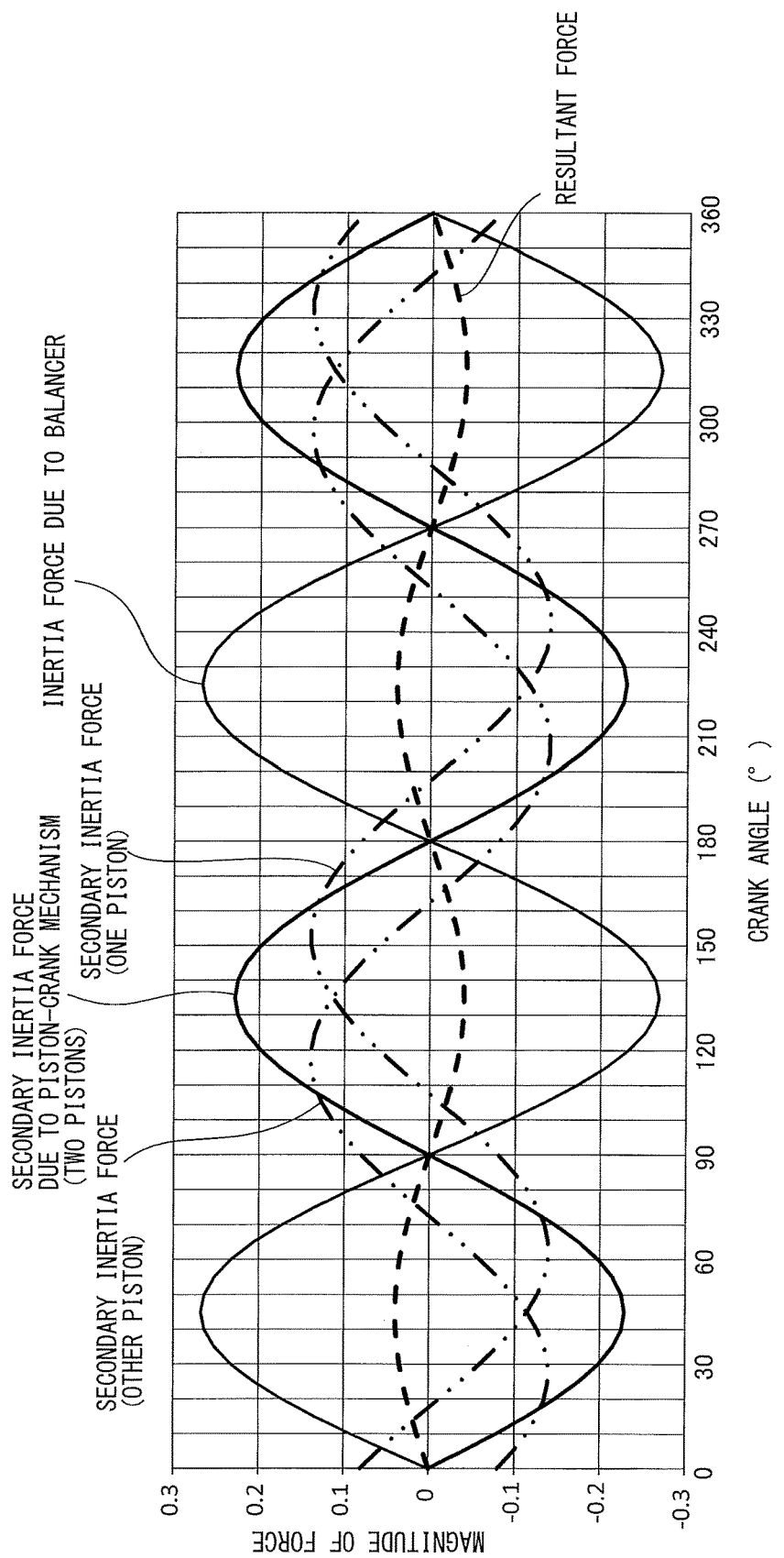
FIG. 16 shows the result of a simulation illustrating the relationship between the secondary inertia force generated by the operation of the piston-crank mechanism, the inertia force produced by the balancer, and their resultant force, where these inertia forces are measured in the x-direction, where $\beta=55°$ and $\alpha=70°$.
Figure 17:
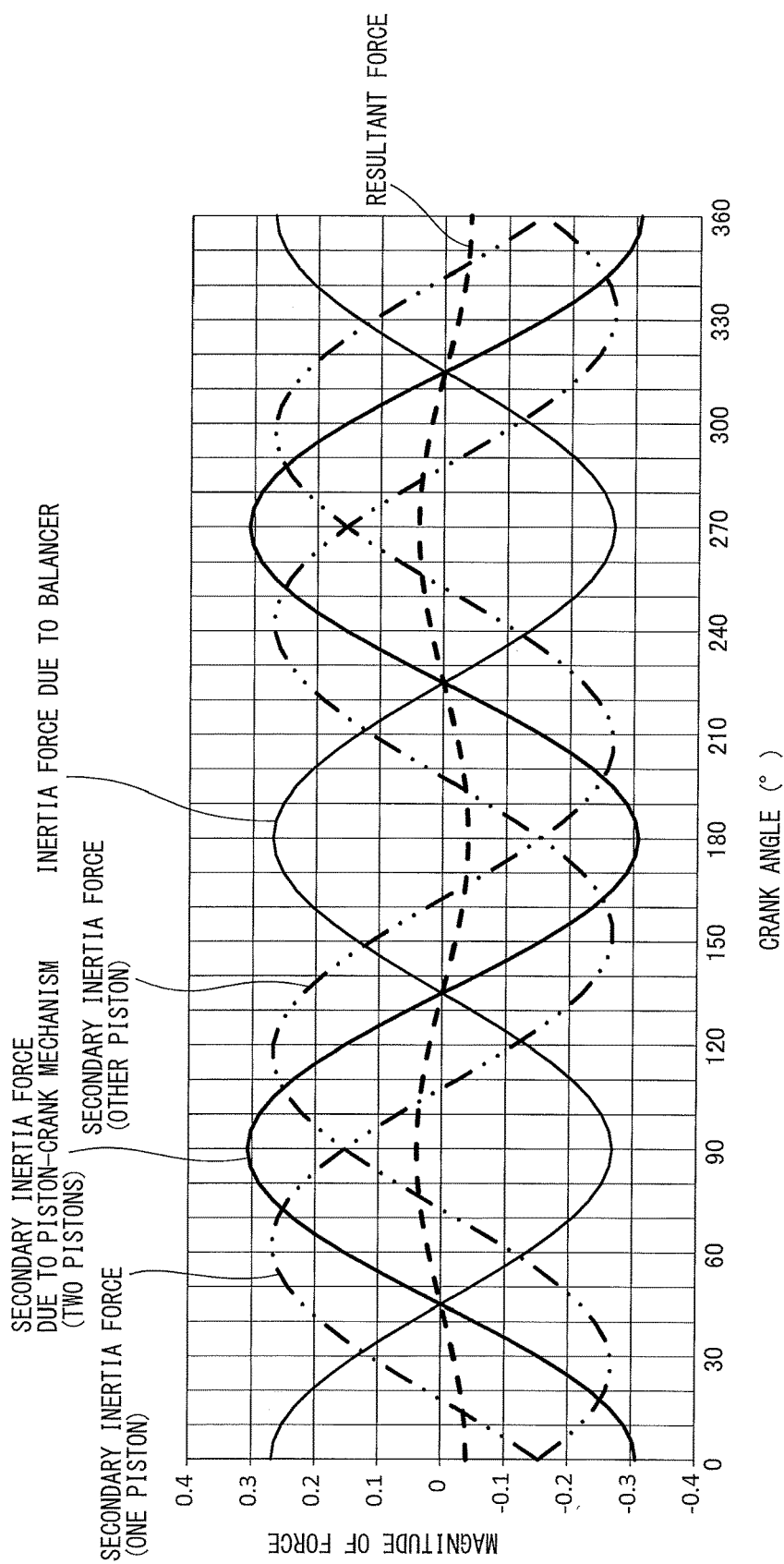
FIG. 17 shows the result of a simulation illustrating the relationship between the secondary inertia force generated by the operation of the piston-crank mechanism, the inertia force produced by the balancer, and their resultant force, where these inertia forces are measured in the y-direction, where $\beta=55°$ and $\alpha=70°$.
Figure 18:
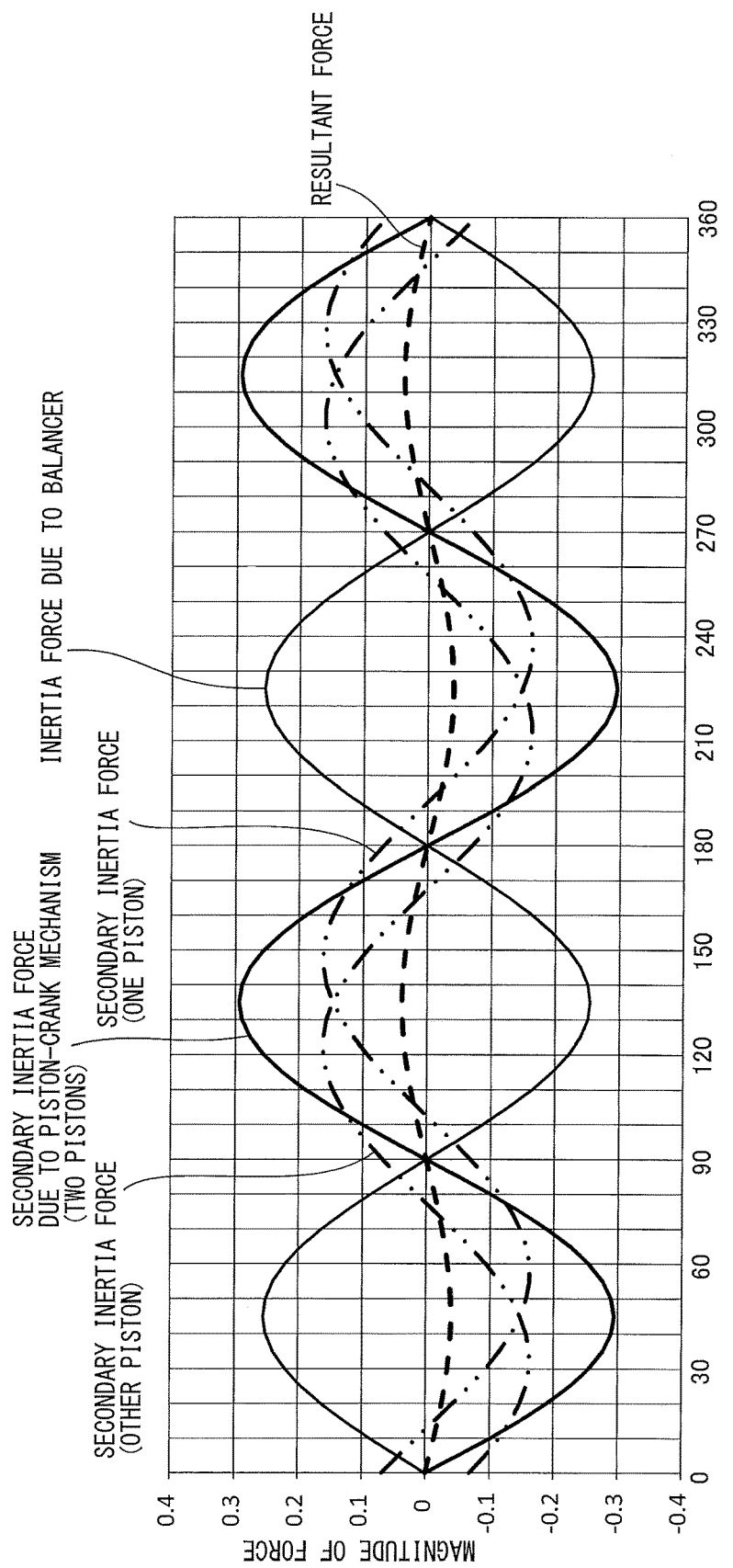
FIG. 18 shows the result of a simulation illustrating the relationship between the secondary inertia force generated by the operation of the piston-crank mechanism, the inertia force produced by the balancer, and their resultant force, where these inertia forces are measured in the x-direction, where $\beta=65°$ and $\alpha=50°$.
Figure 19:
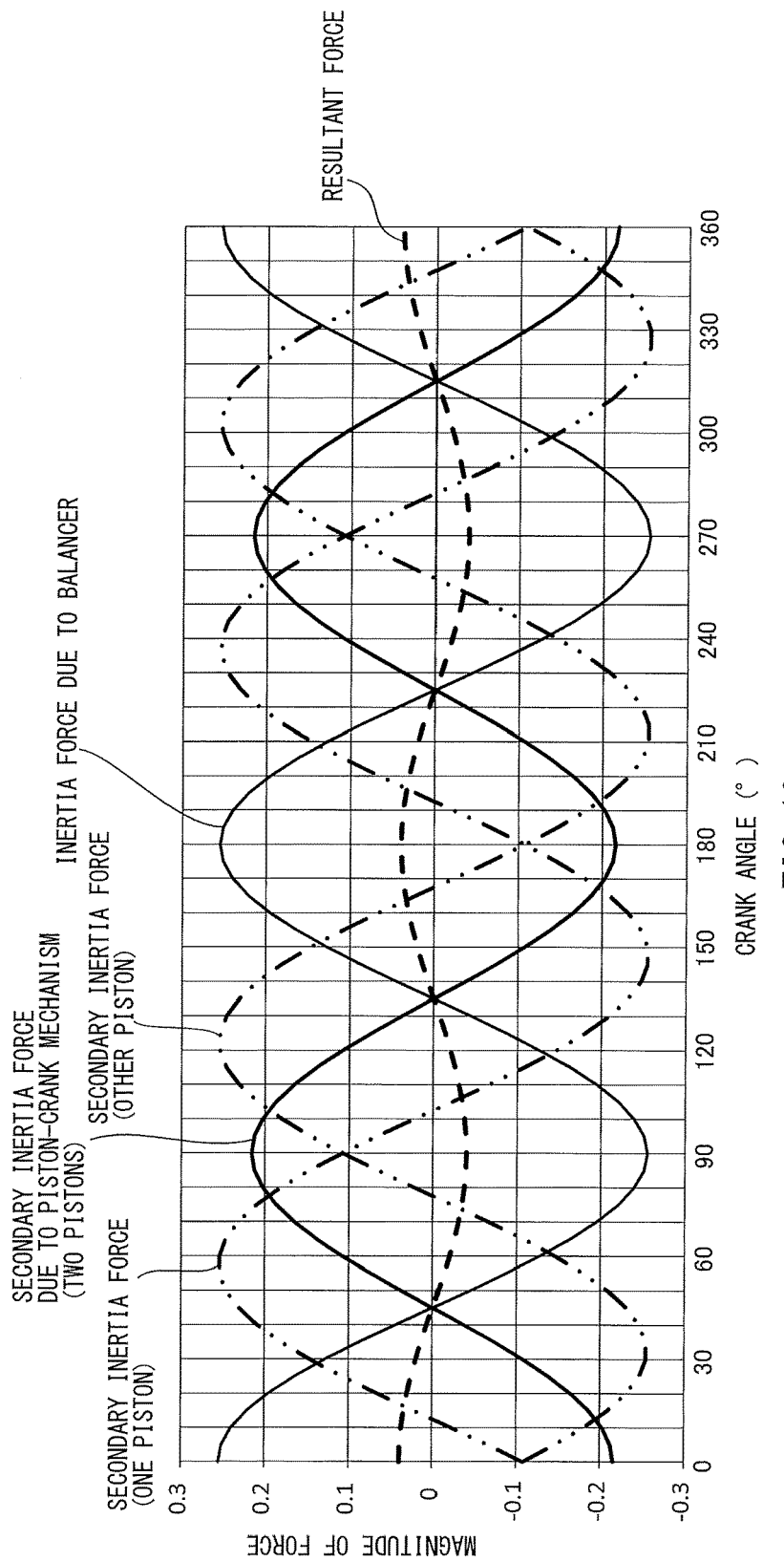
FIG. 19 shows the result of a simulation illustrating the relationship between the secondary inertia force generated by the operation of the piston-crank mechanism, the inertia force produced by the balancer, and their resultant force, where these inertia forces are measured in the y-direction, where $\beta=65°$ and $\alpha=50°$.
Figure 20:
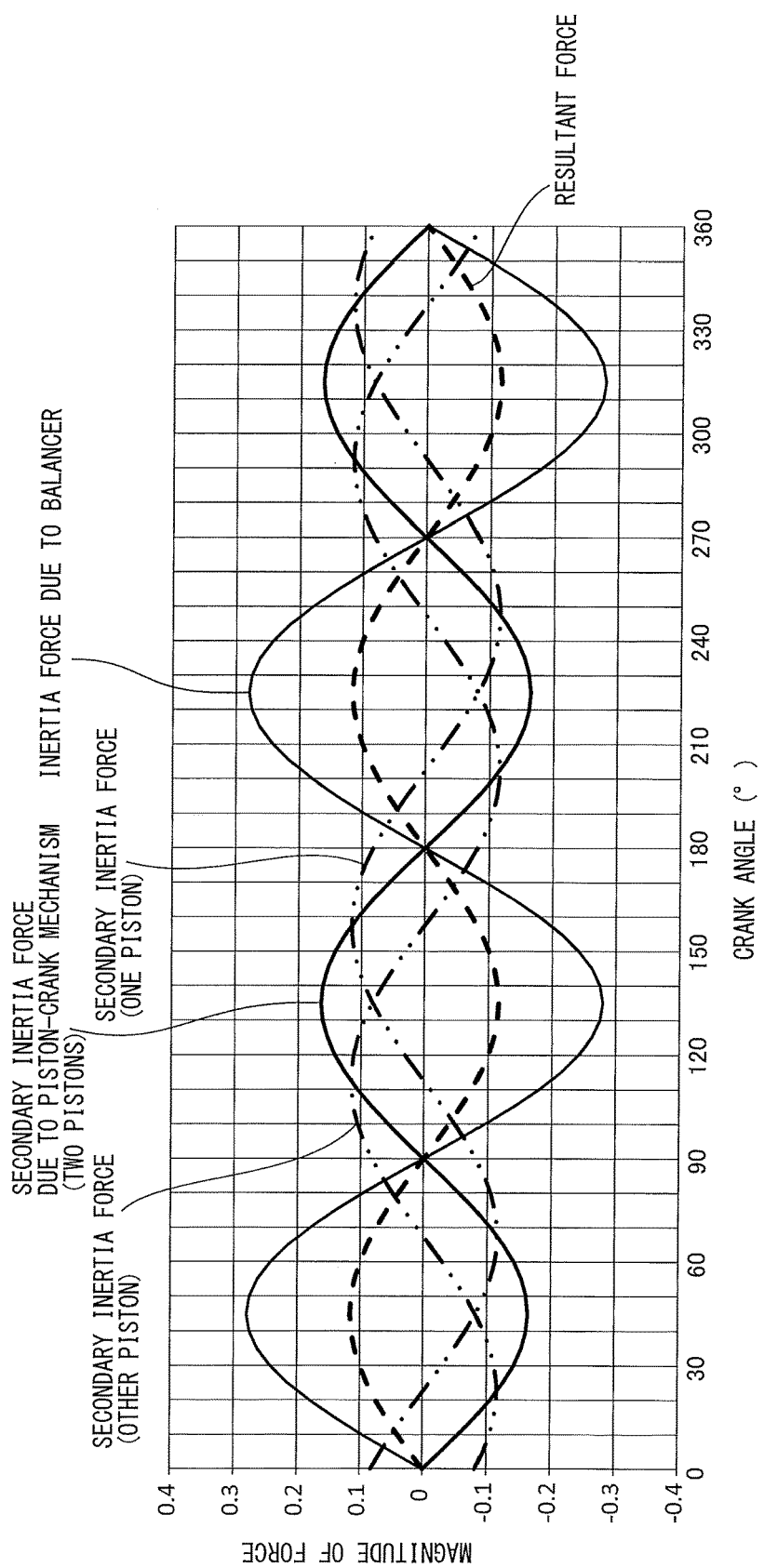
FIG. 20 shows the result of a simulation illustrating the relationship between the secondary inertia force generated by the operation of the piston-crank mechanism, the inertia force produced by the balancer, and their resultant force, where these inertia forces are measured in the x-direction, where $\beta=45°$ and $\alpha=90°$.
Figure 21:
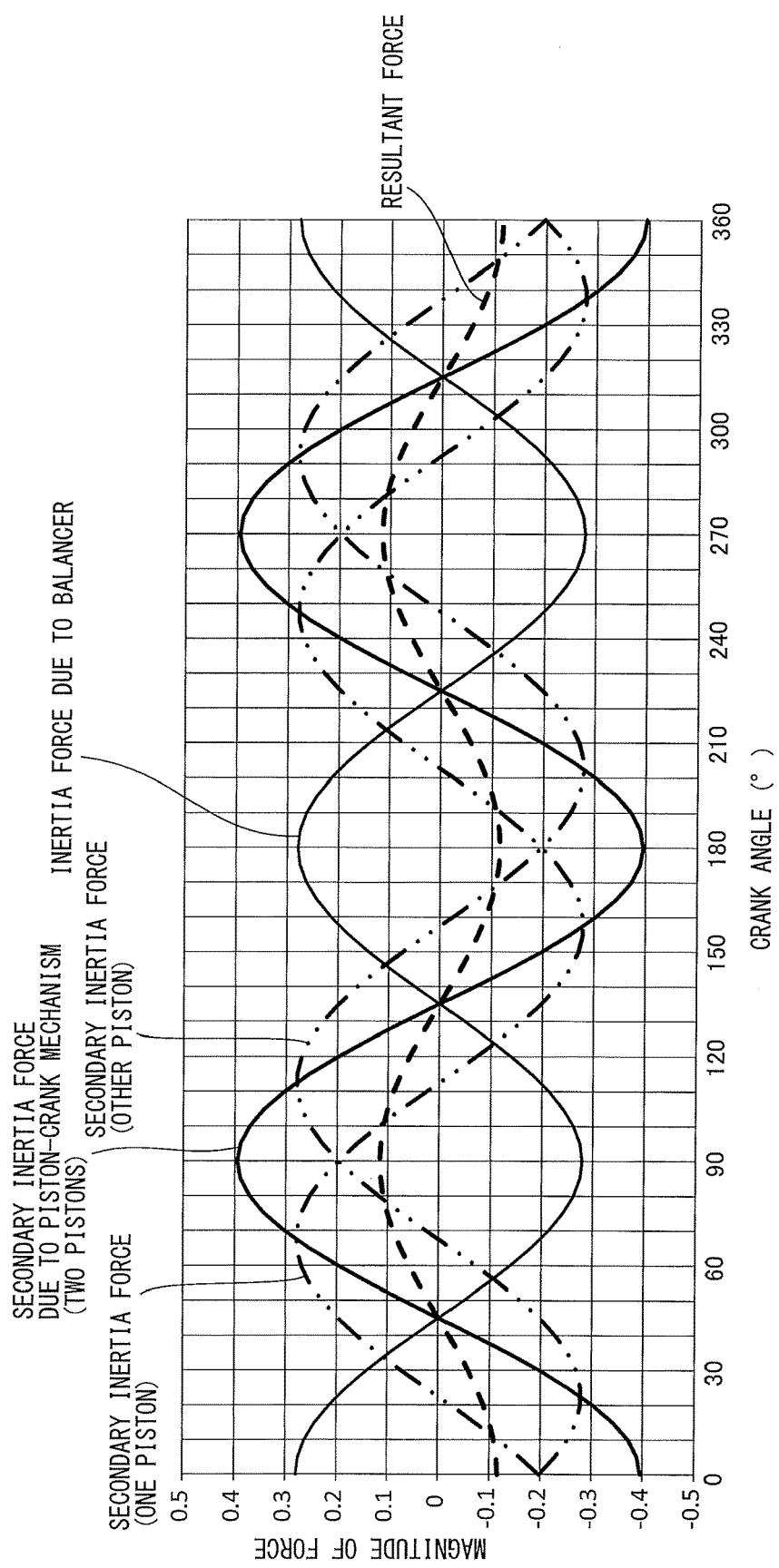
FIG. 21 shows the result of a simulation illustrating the relationship between the secondary inertia force generated by the operation of the piston-crank mechanism, the inertia force produced by the balancer, and their resultant force, where these inertia forces are measured in the y-direction, where $\beta=45°$ and $\alpha=90°$.
Figure 22:
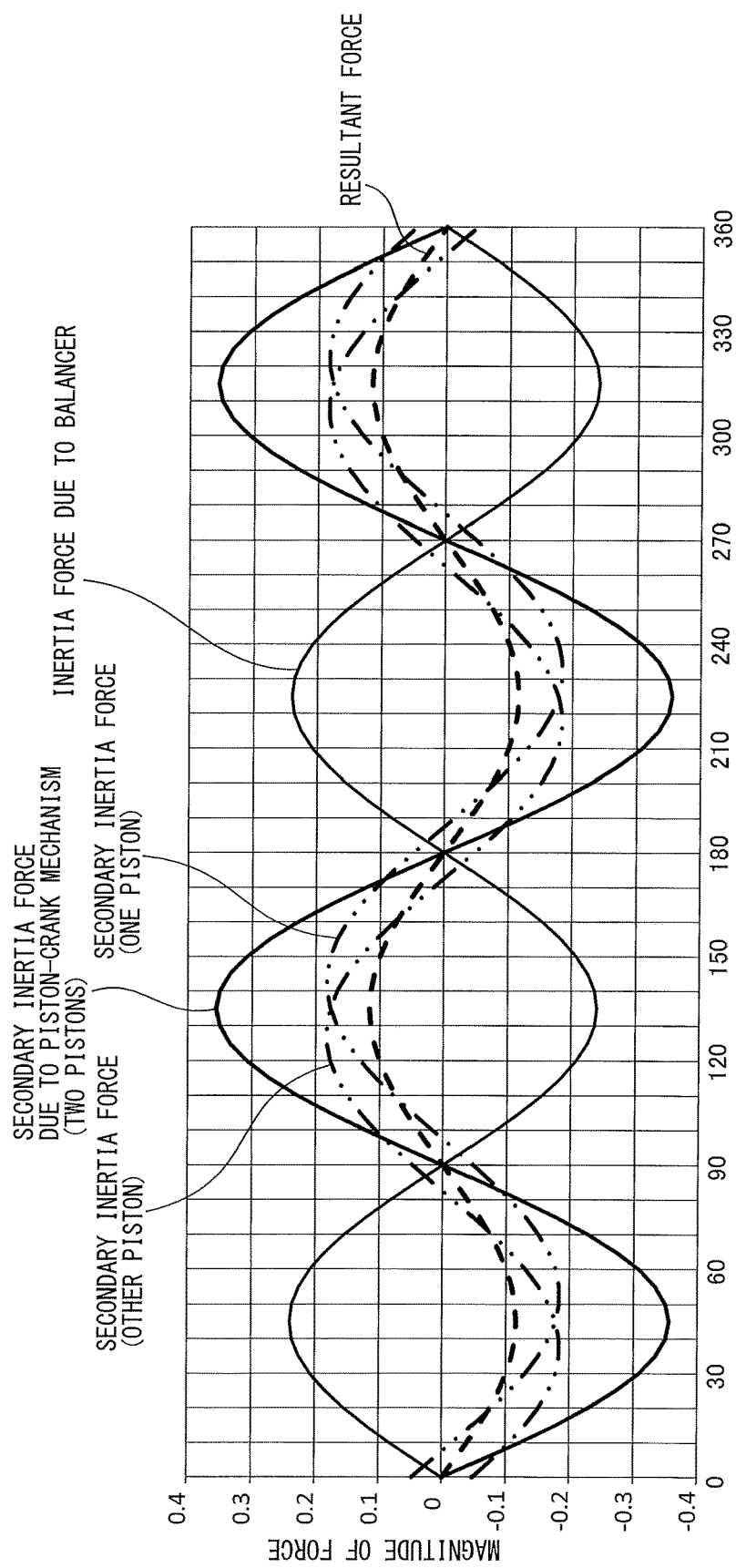
FIG. 22 shows the result of a simulation illustrating the relationship between the secondary inertia force generated by the operation of the piston-crank mechanism, the inertia force produced by the balancer, and their resultant force, where these inertia forces are measured in the x-direction, where $\beta=75°$ and $\alpha=30°$.
Figure 23:
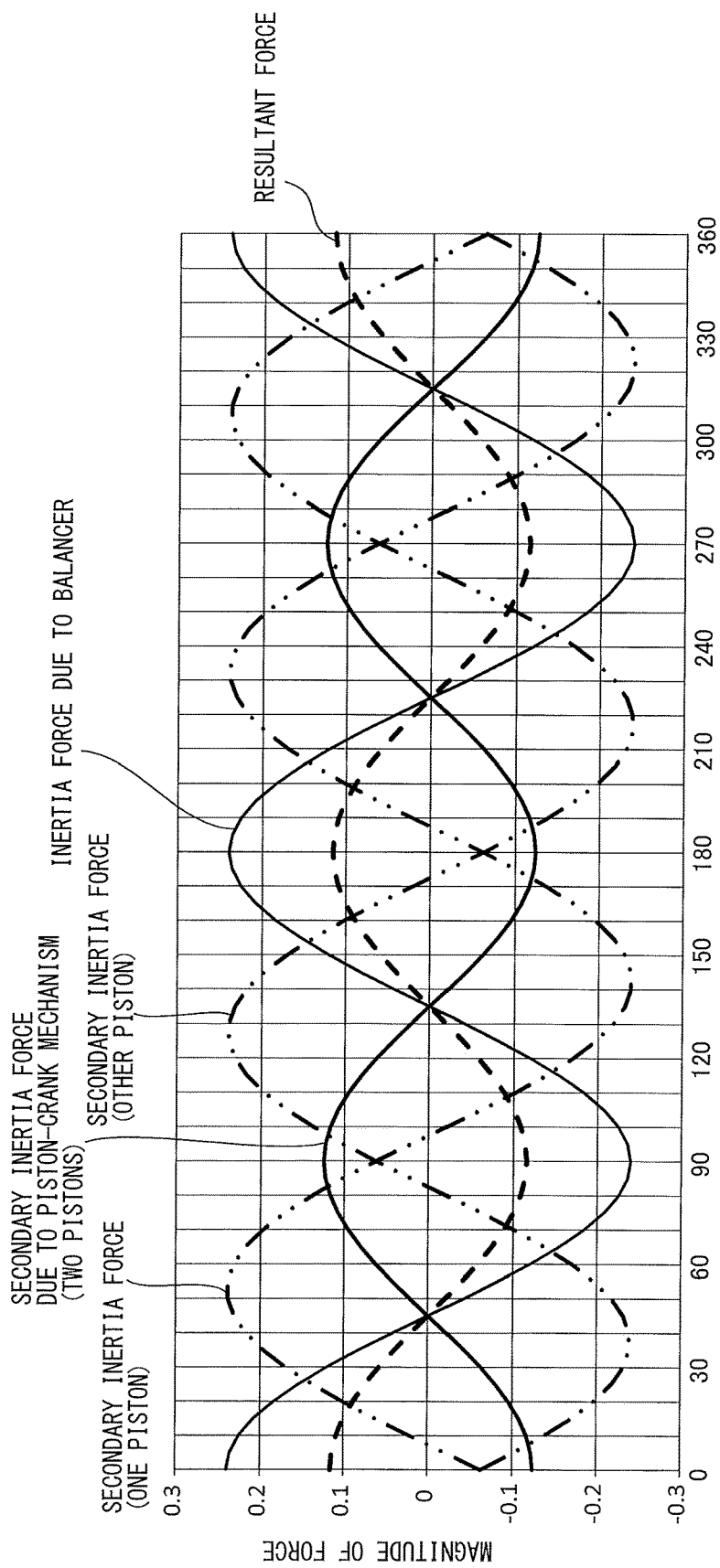
FIG. 23 shows the result of a simulation illustrating the relationship between the secondary inertia force generated by the operation of the piston-crank mechanism, the inertia force produced by the balancer, and their resultant force, where these inertia forces are measured in the y-direction, where $\beta=75°$ and $\alpha=30°$.

FIGS. 14 to 23 show the results of simulations illustrating the relationship between the magnitude of the secondary inertia force generated by the operation of the piston-crank mechanism 22 and the crank angle, the relationship between the magnitude of the inertia force produced by the balancer 46A and the crank angle, and the relationship between the magnitude of the resultant force of these inertia forces and the crank angle. FIG. 14 illustrates the relationship between the magnitudes of the various inertia forces in the x-direction and the crank angle where $\alpha=\beta=60°$. FIG. 15 illustrates the relationship between the magnitudes of the various inertia forces in the y-direction and the crank angle where $\alpha=\beta=60°$. FIG. 16 illustrates the relationship between the magnitudes of the various inertia forces in the x-direction and the crank angle where $\beta=55°$ and $\alpha=70°$. FIG. 17 illustrates the relationship between the magnitudes of the various inertia forces in the y-direction and the crank angle where $\beta=55°$ and $\alpha=70°$. FIG. 18 illustrates the relationship between the magnitudes of the various inertia forces in the x-direction and the crank angle where $\beta=65°$ and $\alpha=50°$. FIG. 19 illustrates the relationship between the magnitudes of the various inertia forces in the y-direction and the crank angle where $\beta=65°$ and $\alpha=50°$. FIG. 20 illustrates the relationship between the magnitudes of the various inertia forces in the x-direction and the crank angle where $\beta=45°$ and $\alpha=90°$. FIG. 21 illustrates the relationship between the magnitudes of the various inertia forces in the y-direction and the crank angle where $\beta=45°$ and $\alpha=90°$. FIG. 22 illustrates the relationship between the magnitudes of the various inertia forces in the x-direction and the crank angle where $\beta=75°$ and $\alpha=30°$. FIG. 23 illustrates the relationship between the magnitudes of the various inertia forces in the y-direction and the crank angle where $\beta=75°$ and $\alpha=30°$.

As shown in FIGS. 14 to 23, if $\beta$ is in the range of 45° to 75°, the secondary inertia force F2B in the x- or y-direction is able to be reduced by about 50% or more.

If $\beta$ is changed, to counteract the secondary inertia couple, the distance between the shaft center 46C of the balancer shaft 46 and the shaft center 33C of the crankshaft 33 (i.e. inter-shaft distance) must be adjusted. For example, if $\beta$ is about 50°, the inter-shaft distance is preferably about 1.3 times that when $\beta$ is about 60°, for example. If $\beta$ is about 45°, the inter-shaft distance is preferably about 1.4 times that when $\beta$ is about 60°, for example. If $\beta$ is larger than about 60°, the inter-shaft distance is preferably smaller than that when $\beta$ is about 60°.

Figure 24:
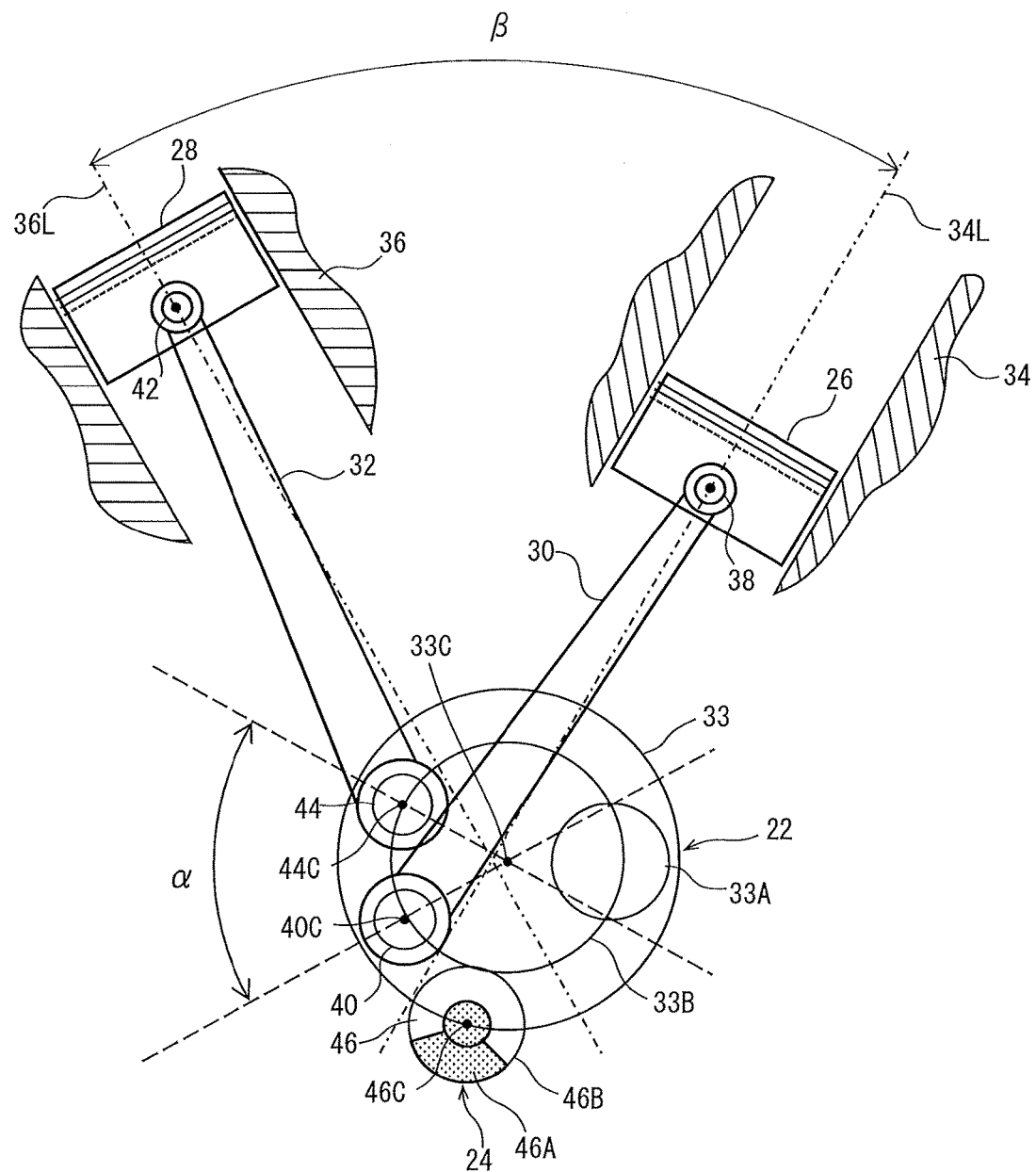
FIG. 24 is a schematic view of the internal structure of an engine included in a motorcycle according to a second preferred embodiment of the present invention.

Next, an engine included in a motorcycle according to a second preferred embodiment of the present invention will be described. FIG. 24 is a schematic view of the internal structure of the engine of the present preferred embodiment. As compared with the first preferred embodiment, the present preferred embodiment includes a piston-crank mechanism 22A instead of the piston-crank mechanism 22. Unlike in the piston-crank mechanism 22, in the piston-crank mechanism 22A, the shaft center 33C of the crankshaft 33 is not located on the cylinder axis 34L nor is it located on the cylinder axis 36L as viewed in the axial direction of the crankshaft 33. In the piston-crank mechanism 22A, the angle of rotation of the crankshaft 33 when the pistons 26 and 28 move from the top dead center to the bottom dead center is larger than the angle of rotation of the crankshaft 33 when the pistons 26 and 28 move from the bottom dead center to the top dead center.

Figure 25:
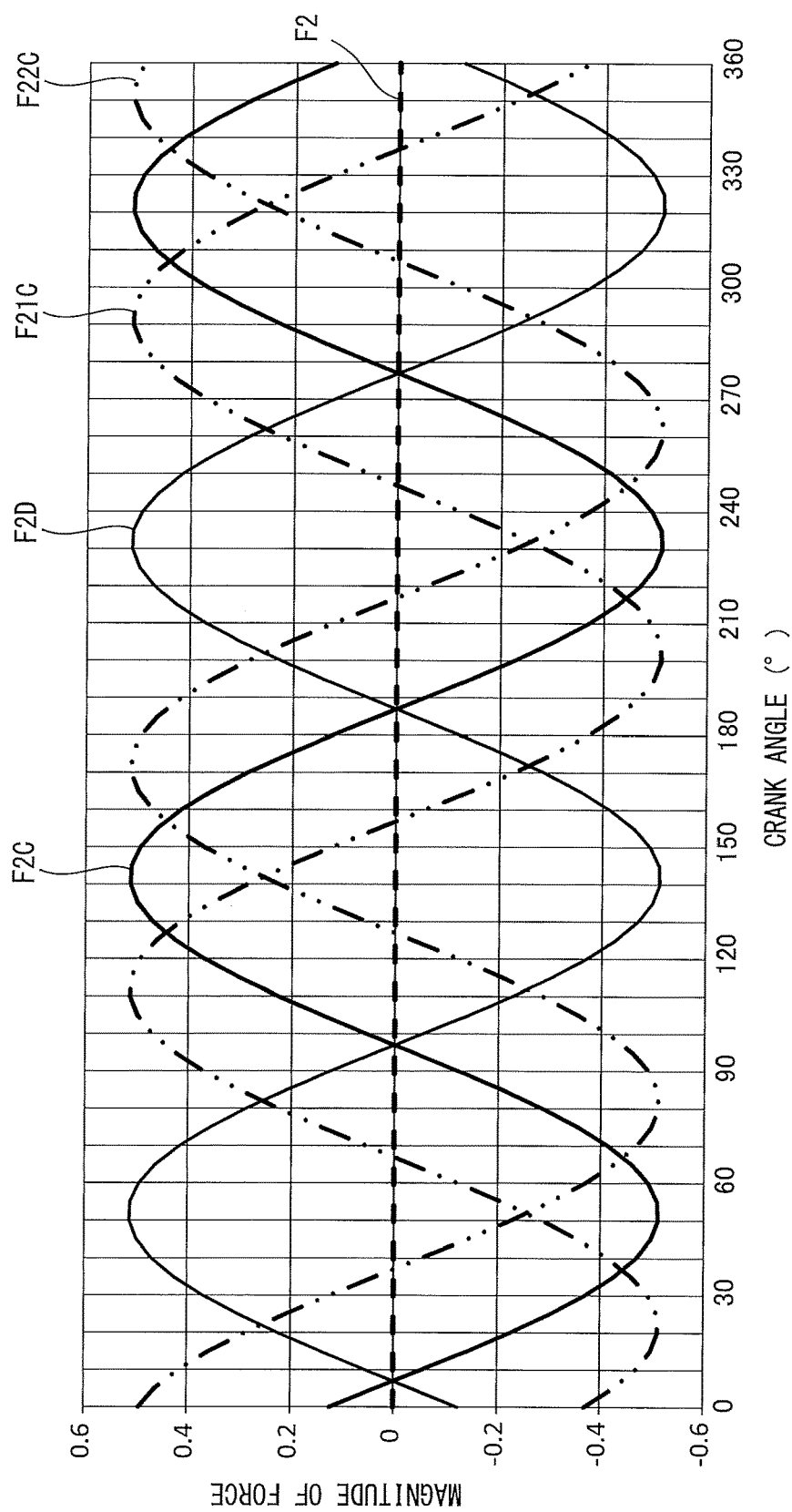
FIG. 25 shows the result of a simulation illustrating the relationship between the magnitude of the secondary inertia couple and the crank angle, where $\alpha=\beta=60°$ and the offset ratio is 20%.

FIG. 25 is similar to FIG. 9 and shows the results of a simulation illustrating the relationship between the magnitude of the secondary inertia couple and the crank angle. FIG. 25 illustrates an implementation where the association ratio $\lambda$ ($=l/r$) is about 3.38 and the offset ratio $\xi$ ($=e/r$) is about 20%, for example. Even when the shaft center 33C of the crankshaft 33 is offset from the cylinder axes 34L and 36L, the secondary inertia couple is reduced. That is, vibration caused by the secondary inertia couple is reduced.

Figure 26:
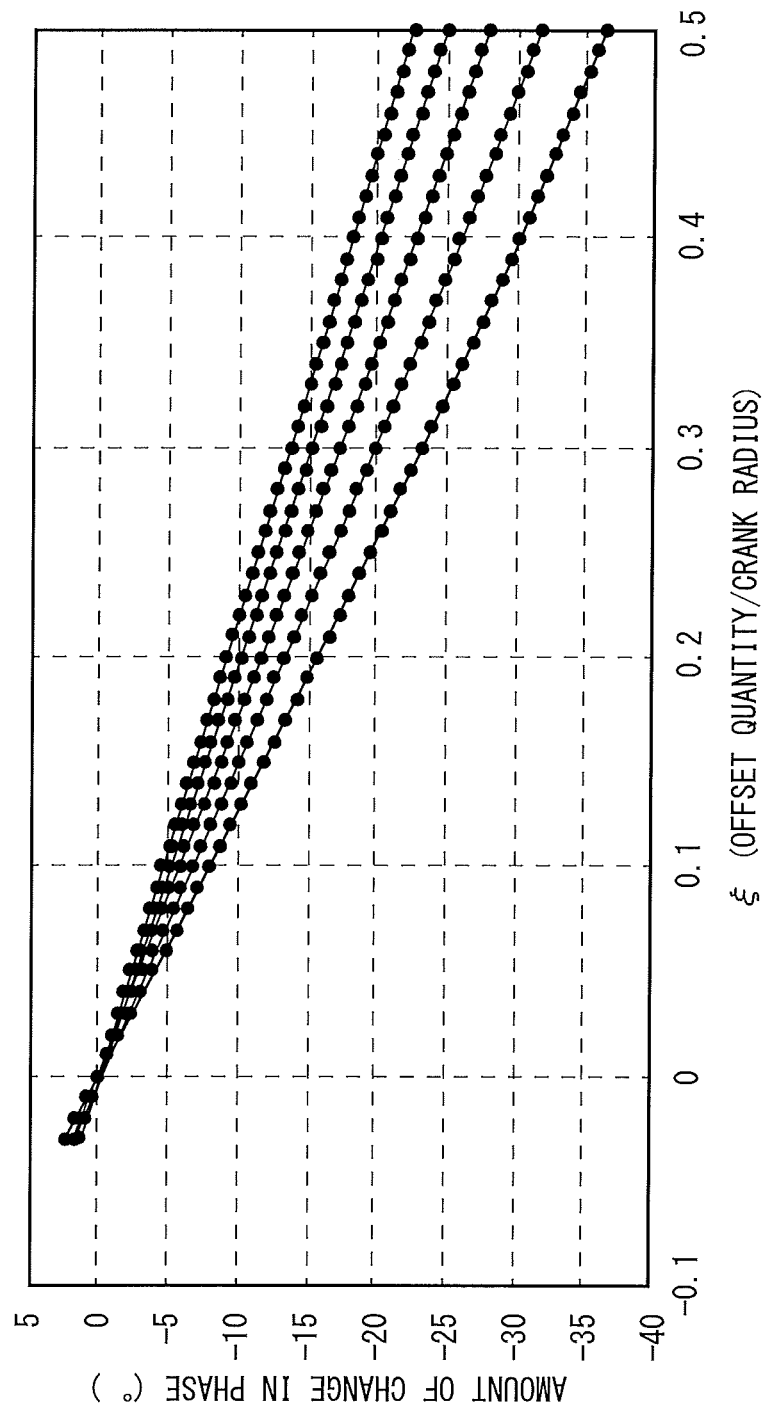
FIG. 26 shows the result of a simulation illustrating the relationship between the offset ratio and the amount of phase change.

FIG. 26 shows the result of a simulation illustrating the relationship between the offset ratio $\xi$ and the amount of change in the phase using the above equation of Formula 82, where $\lambda$ is about 3, about 3.5, about 4, about 4.5 and about 5, for example. A negative value of the amount of change in the phase means a delay in the phase. As shown in FIG. 26, a change in the offset ratio $\xi$ causes a delay in the phase. In view of this, in an engine in which the shaft center 33C of the crankshaft 33 is offset from the cylinder axes 34L and 36L, the positioning and other factors of the balancer shaft 46 are suitably decided considering the amount of change in the phase (i.e., phase delay) which is dependent on the offset ratio.

Although preferred embodiments of the present invention have been described, these preferred embodiments are merely examples for carrying out the present invention. Therefore, the present invention is not limited to the above-illustrated preferred embodiments, and the above-illustrated preferred embodiments may be modified appropriately without departing from the spirit of the present invention.

For example, the above preferred embodiments only include a balancer to reduce vibration generated by the secondary inertia couple caused by the lateral pressures from the pistons. However, preferred embodiments of the present invention may include, in addition to this balancer, a primary couple balancer to counteract a couple generated as the cylinders interact with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A V-shaped engine comprising:
a motion conversion mechanism; and
a balancer mechanism that reduces vibration generated as the motion conversion mechanism operates; wherein
the motion conversion mechanism includes:
a crankshaft;
a first piston that reciprocates within a first cylinder;
a first connecting rod that connects the crankshaft with the first piston;
a first crankpin located on the crankshaft to swingably support the first connecting rod;
a second piston located within a second cylinder, the second cylinder including a cylinder axis extending in a direction crossing a cylinder axis of the first cylinder as viewed in an axial direction of the crankshaft;
a second connecting rod that connects the crankshaft with the second piston; and
a second crankpin located on the crankshaft, the second crankpin being located at a position different from that of the first crankpin in a circumferential direction of the crankshaft, the second crankpin swingably supporting the second connecting rod;
the cylinder axis of the first cylinder and the cylinder axis of the second cylinder define a splay angle in a range of 45° to 75°;
the first and second crankpins have a phase difference in a circumferential direction of a shaft center of the crankshaft in a range of 30° to 90°;
the balancer mechanism includes a balancer shaft parallel or substantially parallel to the crankshaft, the balancer shaft rotating in a direction opposite to that in which the crankshaft rotates at a speed twice that at which the crankshaft rotates;
a first reference line extends through the shaft center of the crankshaft as viewed in the axial direction of the crankshaft and divides the splay angle into two equal sub-angles;
a second reference line is perpendicular or substantially perpendicular to the first reference line and extends through the shaft center of the crankshaft as viewed in the axial direction of the crankshaft;
the balancer shaft is located on a side of the second reference line which is opposite to a side including the first and second pistons as viewed in the axial direction of the crankshaft; and
a secondary component of an inertia force generated as the motion conversion mechanism operates and an inertia force generated as the balancer shaft rotates are used to reduce vibration generated by a secondary component of an inertia couple caused by a lateral pressure from the first piston and a lateral pressure from the second piston.

2. The V-shaped engine according to claim 1, wherein the balancer shaft is located between the cylinder axis of the first cylinder and the cylinder axis of the second cylinder as viewed in the axial direction of the crankshaft.

3. The V-shaped engine according to claim 2, wherein the balancer shaft overlies the first reference line as viewed in the axial direction of the crankshaft.

4. The V-shaped engine according to claim 3, wherein the shaft center of the balancer shaft overlies the first reference line as viewed in the axial direction of the crankshaft.

5. The V-shaped engine according to claim 1, wherein:
the crankshaft includes a driving gear; and
the balancer shaft includes a driven gear that is able to engage with the driving gear.

6. The V-shaped engine according to claim 1, wherein:
the shaft center of the crankshaft is not located on the cylinder axis of the first cylinder and not located on the cylinder axis of the second cylinder as viewed in the axial direction of the crankshaft;
in the motion conversion mechanism, an angle of rotation of the crankshaft when the first piston moves from a top dead center to a bottom dead center is larger than an angle of rotation of the crankshaft when the first piston moves from the bottom dead center to the top dead center, and an angle of rotation of the crankshaft when the second piston moves from a top dead center to a bottom dead center is larger than an angle of rotation of the crankshaft when the second piston moves from the bottom dead center to the top dead center.

7. A straddled vehicle comprising the V-shaped engine according to claim 1.

* * * * *